(12) United States Patent
Nagasaka

(10) Patent No.: US 11,880,922 B2
(45) Date of Patent: Jan. 23, 2024

(54) AGENT PROVIDING SYSTEM, AGENT PROVIDING METHOD, AND RECORDING MEDIUM

(71) Applicant: Sony Group Corporation, Tokyo (JP)

(72) Inventor: Hideo Nagasaka, Tokyo (JP)

(73) Assignee: Sony Group Corporation, Tokyo (JP)

( * ) Notice: Subject to any disclaimer, the term of this patent is extended or adjusted under 35 U.S.C. 154(b) by 3 days.

(21) Appl. No.: 17/637,451

(22) PCT Filed: Aug. 17, 2020

(86) PCT No.: PCT/JP2020/030951
§ 371 (c)(1),
(2) Date: Feb. 23, 2022

(87) PCT Pub. No.: WO2021/039456
PCT Pub. Date: Mar. 4, 2021

(65) Prior Publication Data
US 2022/0277504 A1 Sep. 1, 2022

(30) Foreign Application Priority Data
Aug. 27, 2019 (JP) ................................. 2019-154612

(51) Int. Cl.
*G06T 13/00* (2011.01)
(52) U.S. Cl.
CPC .................................. *G06T 13/00* (2013.01)
(58) Field of Classification Search
CPC .............................. G06T 13/00; H04N 7/157
See application file for complete search history.

(56) References Cited

U.S. PATENT DOCUMENTS

2009/0254859 A1 10/2009 Arrasvuori
2010/0057715 A1* 3/2010 Bates ...................... G06F 21/31
707/E17.014

FOREIGN PATENT DOCUMENTS

| JP | 2000-20888 A | 1/2000 |
| JP | 2002-8062 A | 1/2002 |
| JP | 2002-342049 A | 11/2002 |
| JP | 2005-149481 A | 6/2005 |
| JP | 2006-230586 A | 9/2006 |
| JP | 5945045 B1 | 7/2016 |
| JP | 2019-118649 A | 7/2019 |
| KR | 101866407 B1 | 6/2018 |

OTHER PUBLICATIONS

International Search Report and Written Opinion dated Sep. 24, 2020, received for PCT Application PCT/JP2020/030951, Filed on Aug. 17, 2020, 10 pages including English Translation.

* cited by examiner

*Primary Examiner* — Said Broome
*Assistant Examiner* — Donna J. Ricks
(74) *Attorney, Agent, or Firm* — XSENSUS LLP

(57) ABSTRACT

The present technology relates to an agent providing system, an agent providing method, and a recording medium that make it possible to provide a more suitable agent.
There is provided an agent providing system including a control unit that, when newly providing an agent to a cyberspace in which a plurality of agents is allowed to be registered, provides an agent that is separated by a certain amount or more in terms of appearance or voice from an agent already registered in the cyberspace. The present technology can be applied to, for example, an agent providing system that provides an agent to be registered in a cyberspace.

20 Claims, 26 Drawing Sheets

FIG. 5

EYES
a) TYPE
1, #2, #3 . . .
b) SIZE
1, #2, #3 . . .
c) RELATIVE POSITION IN FACE
1, #2, #3 . . .

MOUTH
a) TYPE
1, #2, #3 . . .
b) SIZE
1, #2, #3 . . .
c) RELATIVE POSITION IN FACE
1, #2, #3 . . .

NOSE
a) TYPE
1, #2, #3 . . .
b) SIZE
1, #2, #3 . . .
c) RELATIVE POSITION IN FACE
1, #2, #3 . . .

AGENT PROVIDING SYSTEM, AGENT PROVIDING METHOD, AND RECORDING MEDIUM

CROSS-REFERENCE TO RELATED APPLICATIONS

The present application is based on PCT filing PCT/JP2020/030951, filed Aug. 17, 2020, which claims priority to Japanese Patent Application No. 2019-154612, filed Aug. 27, 2019, the entire contents of each are incorporated herein by reference.

TECHNICAL FIELD

The present technology relates to an agent providing system, an agent providing method, and a recording medium and particularly relates to an agent providing system, an agent providing method, and a recording medium enabled to provide a more suitable agent.

BACKGROUND ART

In recent years, with the evolution of information and communication technologies, services that provide cyberspaces have become widespread. In this sort of services, there is a service in which diverse services are provided by an agent used in a cyberspace by registering the agent.

As technologies related to the agent, for example, technologies disclosed in Patent Documents 1 to 3 are known.

CITATION LIST

Patent Document

Patent Document 1: Japanese Patent Application Laid-Open No. 2005-149481
Patent Document 2: Japanese Patent Application Laid-Open No. 2000-20888
Patent Document 3: Japanese Patent Application Laid-Open No. 2002-342049

SUMMARY OF THE INVENTION

Problems to be Solved by the Invention

Incidentally, in a case where a plurality of agents is allowed to be registered in a cyberspace, there is a possibility that the agent can no longer be identified if there is a resembling agent in appearance and voice. Therefore, in a case where a plurality of agents is allowed to be registered in a cyberspace, it is required to provide a more suitable agent.

The present technology has been made in view of such a situation and is intended to make it possible to provide a more suitable agent.

Solutions to Problems

An agent providing system according to an aspect of the present technology is an agent providing system including a control unit that, when newly providing an agent to a cyberspace in which a plurality of agents is allowed to be registered, provides an agent that is separated by a certain amount or more in terms of appearance or voice from an agent already registered in the cyberspace.

An agent providing method according to an aspect of the present technology is an agent providing method including, when newly providing an agent to a cyberspace in which a plurality of agents is allowed to be registered, providing, by an agent providing system, an agent that is separated by a certain amount or more in terms of appearance or voice from an agent already registered in the cyberspace.

A recording medium according to an aspect of the present technology is a recording medium recording a program for causing a computer to function as a control unit that, when newly providing an agent to a cyberspace in which a plurality of agents is allowed to be registered, provides an agent that is separated by a certain amount or more in terms of appearance or voice from an agent already registered in the cyberspace.

In an agent providing system, an agent providing method, and a recording medium according to an aspect of the present technology, when an agent is newly provided to a cyberspace in which a plurality of agents is allowed to be registered, an agent that is separated by a certain amount or more in terms of appearance or voice from an agent already registered in the cyberspace is provided.

BRIEF DESCRIPTION OF DRAWINGS

FIG. 5 is a diagram illustrating an example of a method of generating a unique figure.

MODE FOR CARRYING OUT THE INVENTION

Hereinafter, embodiments of the present technology will be described with reference to the drawings. Note that the description will be given in the following order.
1. First Embodiment: Basic Configuration
2. Second Embodiment: Method of Registering in Private Cyberspace
3. Third Embodiment: Method of Changing Appearance or Voice of Same Agent depending on Users
4. Fourth Embodiment: Method of Providing Group Agent
5. Fifth Embodiment: Method of Generating New Appearance or Voice When Identification is not Possible
6. Sixth Embodiment: Method of Registering in Public Cyberspace
7. Seventh Embodiment: Method of Generating Voice of Agent
8. Modifications
9. Configuration of Computer (Representative Diagram)

Figure 1:
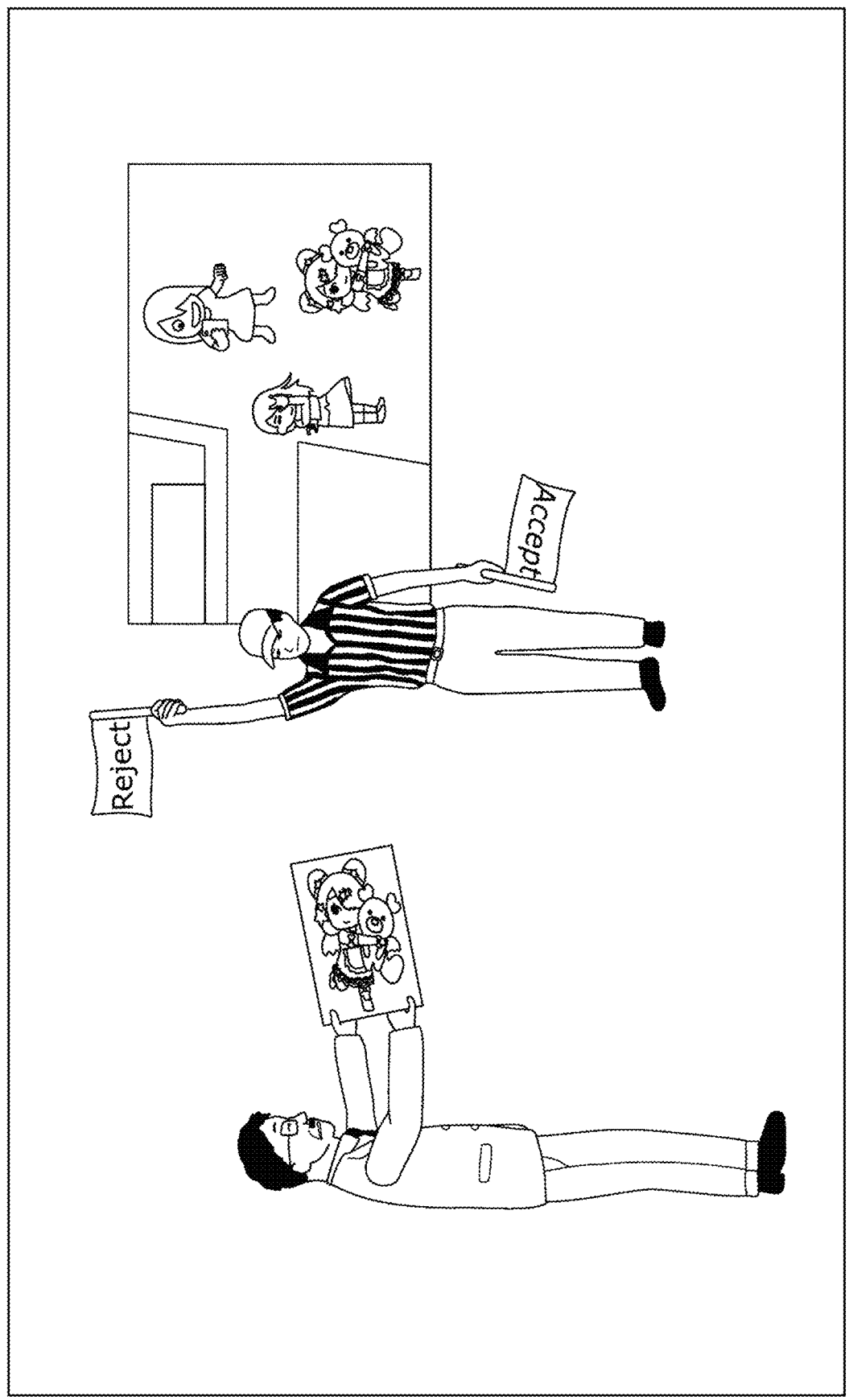
FIG. 1 is a representative diagram illustrating an outline of the present technology.

FIG. 1 is a representative diagram illustrating an outline of the present technology.

An agent providing system to which the present technology is applied is intended to, when newly providing an agent to a cyberspace in which a plurality of agents is allowed to be registered, provide an agent that is separated by a certain amount or more in terms of appearance or voice from an agent already registered in the cyberspace.

In FIG. 1, a user submits a character agent as a new agent to be used in a cyberspace. However, in the cyberspace, an agent whose appearance or voice is similar to (not separated by a certain amount or more from) the newly submitted agent has already been registered.

Therefore, the agent newly submitted by the user will be rejected by being validated as "Reject" and will not be provided to the cyberspace.

On the other hand, although not illustrated, in a case where a new agent that is not similar to (is separated by a certain amount or more from) agents already registered in the cyberspace in terms of appearance or voice is submitted, the submitted new agent is accepted by being validated as "Accept" and will be provided to the cyberspace.

In this manner, the agent providing system to which the present technology is applied has a kind of function as an authentication authority that authenticates a new agent to be provided into the cyberspace and can provide an agent whose uniqueness of the appearance or voice is ensured to the cyberspace.

1. First Embodiment (Configuration Example of System)

Figure 2:
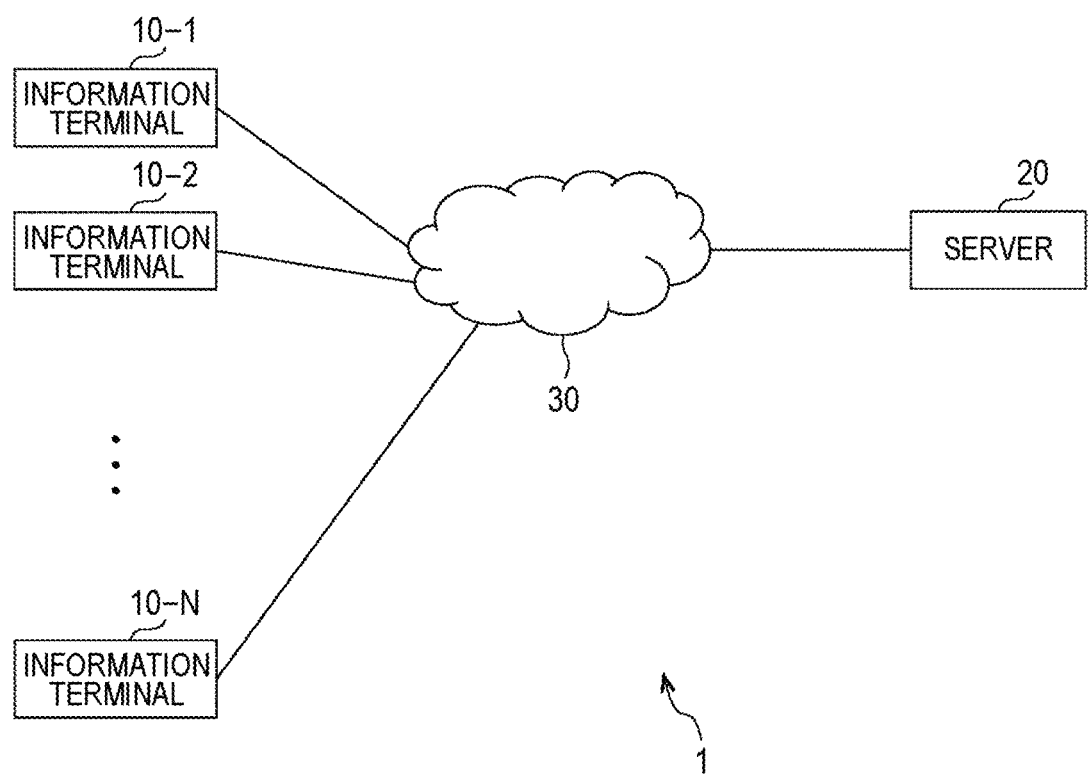
FIG. 2 is a diagram illustrating an example of a configuration of an agent providing system to which the present technology is applied.

FIG. 2 illustrates an example of a configuration of the agent providing system to which the present technology is applied.

The agent providing system 1 is constituted by information terminals 10-1 to 10-N (N: an integer equal to or greater than one), and a server 20.

In the agent providing system 1, the information terminals 10-1 to 10-N and the server 20 are interconnected via a network 30. The network 30 includes a communication network such as the Internet, an intranet, or a mobile phone network.

The information terminal 10-1 is an electronic instrument having a predetermined user interface (UI), such as a personal computer, a smartphone, a mobile phone, a tablet terminal, a game machine, or a wearable instrument.

The information terminal 10-1 makes various actions according to a user's operation on the predetermined user interface.

For example, the information terminal 10-1 sends a demand relating to an agent to the server 20 via the network 30 in response to a user's operation. The information terminal 10-1 receives a response relating to the agent, which is sent from the server 20 via the network 30. The information terminal 10-1 performs various processes relating to the agent on the basis of the received response.

Each of the information terminals 10-2 to 10-N is configured as an electronic instrument such as a personal computer similarly to the information terminal 10-1. Each of the information terminals 10-2 to 10-N is capable of exchanging a demand and a response relating to an agent with the server 20 via the network 30 and performing various processes according to the received response.

Note that, in the following description, the information terminals 10-1 to 10-N will be simply referred to as information terminals 10 in a case where it is not particularly necessary to distinguish between the information terminals 10-1 to 10-N.

The server 20 is constituted by one or a plurality of servers. The server 20 performs various processes relating to agents.

For example, the server 20 receives a demand relating to an agent, which is sent from the information terminal 10 via the network 30. The server 20 performs various processes relating to the agent on the basis of the received demand. The server 20 sends a response relating to the agent, which has been obtained in the various processes, to the information terminal 10 via the network 30.

(Configuration Example of Information Terminal)

Figure 3:
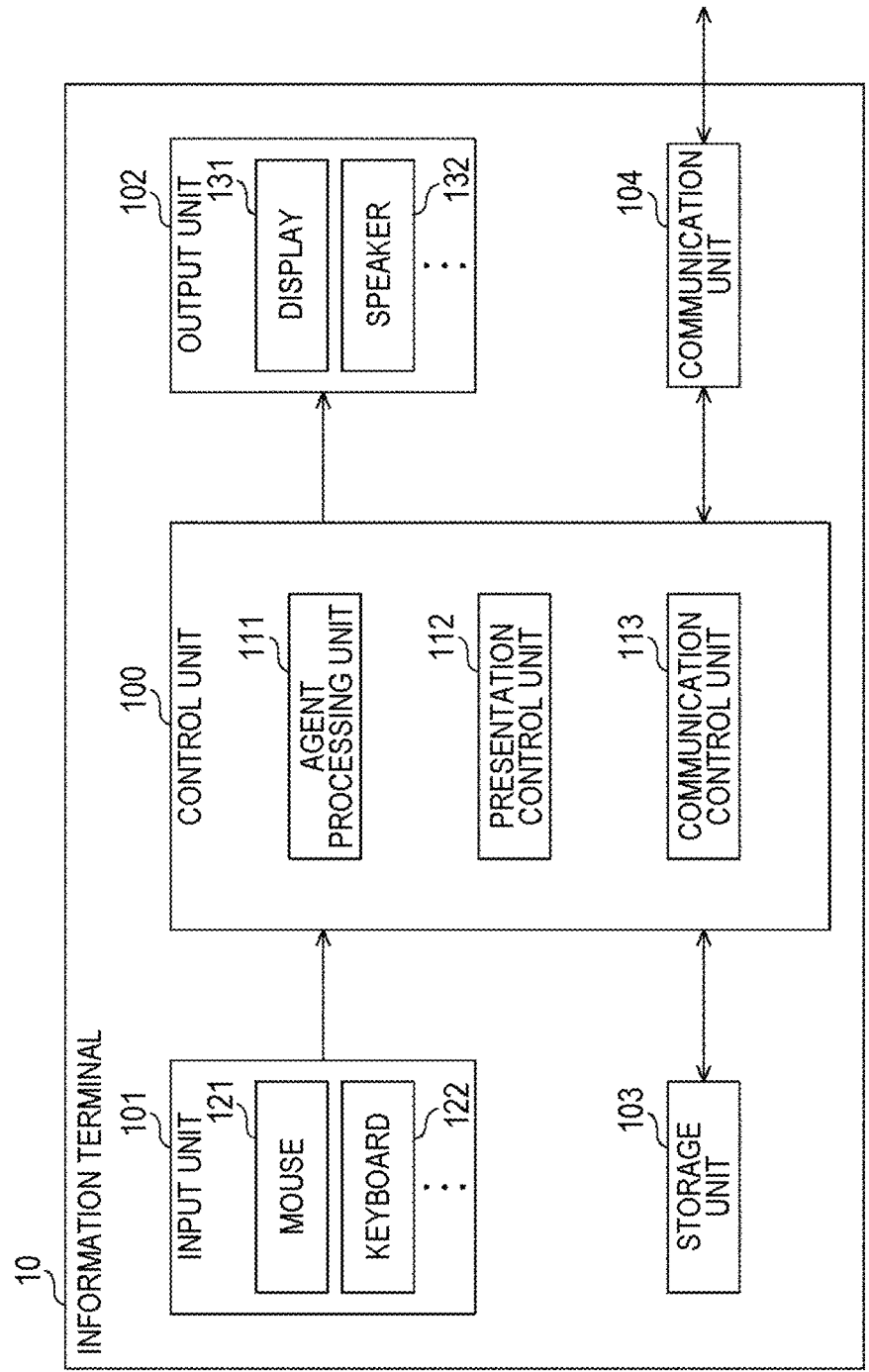
FIG. 3 is a diagram illustrating an example of a configuration of an information terminal in FIG. 2.

FIG. 3 illustrates an example of a configuration of the information terminal 10 in FIG. 2.

In FIG. 3, the information terminal 10 is constituted by a control unit 100, an input unit 101, an output unit 102, a storage unit 103, and a communication unit 104.

The control unit 100 is constituted by a processor such as a central processing unit (CPU), or the like. The control unit 100 is a main control device (processing device) that controls the action of each unit and performs various arithmetic processes.

The input unit 101 is an input device such as a mouse 121, a keyboard 122, or a physical button. The input unit 101 supplies operation data according to a user's operation to the control unit 100. The control unit 100 controls the action of each unit on the basis of the operation data from the input unit 101.

The output unit 102 is an output device such as a display 131 or a speaker 132. The output unit 102 outputs information according to various sorts of data under the control of the control unit 100.

The display 131 displays video according to video data from the control unit 100. The speaker 132 outputs audio (sound) according to audio data from the control unit 100.

Note that the display 131 may be configured as a touch panel together with an input unit that supplies the control unit 100 with operation data according to a contact position (the position of a predetermined point) obtained when a user's finger makes contact with (touches) a surface of a screen of the display 131.

The storage unit 103 is an auxiliary storage device including a semiconductor memory such as a nonvolatile memory or a hard disk drive (HDD). The storage unit 103 stores various sorts of data under the control of the control unit 100. Note that the storage unit 103 may be configured as an internal storage or may be an external storage such as a memory card.

The communication unit 104 is a communication device including a communication module compatible with wireless communication or wired communication conforming to a predetermined standard. The communication unit 104 communicates with other equipment such as the server 20 via the network 30 under the control of the control unit 100.

Furthermore, the control unit 100 includes an agent processing unit 111, a presentation control unit 112, and a communication control unit 113.

The agent processing unit 111 performs processes relating to an agent provided to the cyberspace (a process of registering an agent, a process of operating a registered agent, and the like) in accordance with an operation from the user. Note that details of the processes relating to the agent will be described later.

The presentation control unit 112 controls the output unit 102 such as the display 131 and the speaker 132 to present various sorts of information.

The communication control unit 113 controls the communication unit 104 to communicate with other equipment via the network 30.

(Configuration Example of Server)

Figure 4:
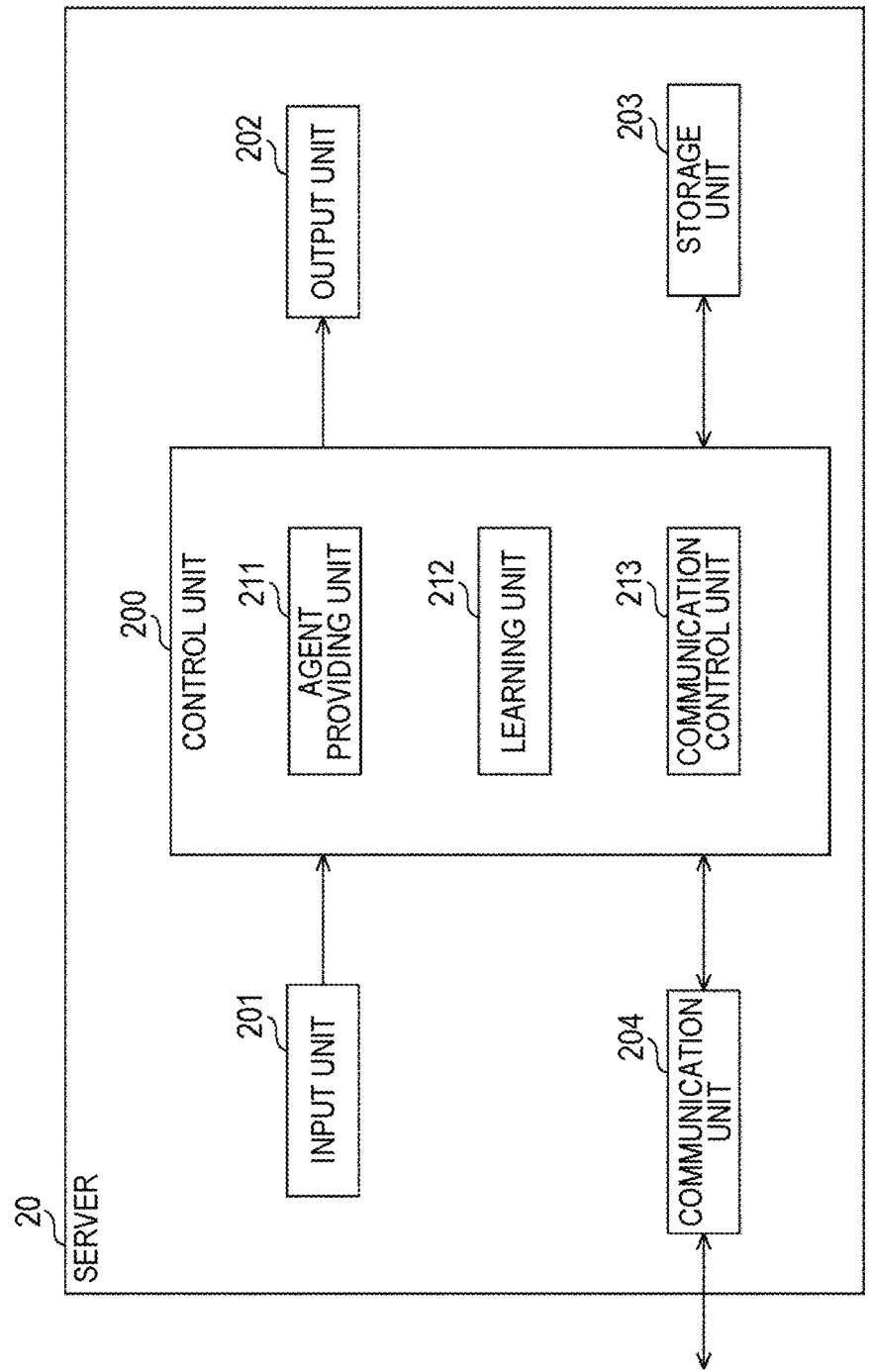
FIG. 4 is a diagram illustrating an example of a configuration of a server in FIG. 2.

FIG. 4 illustrates an example of a configuration of the server 20 in FIG. 2.

In FIG. 4, the server 20 is constituted by a control unit 200, an input unit 201, an output unit 202, a storage unit 203, and a communication unit 204.

The control unit 200 is constituted by a processor such as a CPU, or the like. The control unit 200 is a main control device (processing device) that controls the action of each unit and performs various arithmetic processes.

The input unit 201 is an input device such as a mouse, a keyboard, or a physical button. The input unit 201 supplies input data according to a user's operation or the like to the control unit 200. The control unit 200 controls the action of each unit on the basis of the input data from the input unit 201.

The output unit 202 is an output device such as a display or a speaker. The output unit 202 outputs information according to various sorts of data such as video and audio under the control of the control unit 200.

The storage unit 203 is a large-capacity auxiliary storage device including a semiconductor memory such as a non-volatile memory and an HDD. The storage unit 203 stores various sorts of data under the control of the control unit 200.

The communication unit 204 is a communication device including a communication module compatible with wireless communication or wired communication conforming to a predetermined standard. The communication unit 204 communicates with other equipment such as the information terminal 10 via the network 30 under the control of the control unit 200.

Furthermore, the control unit 200 includes an agent providing unit 211, a learning unit 212, and a communication control unit 213.

The agent providing unit 211 performs an agent providing process for providing an agent to the cyberspace. Note that details of the agent providing process will be described later.

The learning unit 212 performs machine learning on the basis of input information (learning data) and outputs a result of the machine learning. The agent providing unit 211 identifies (for example, verifies or predicts) the input information on the basis of the input information and the result of the machine learning.

The communication control unit 213 controls the communication unit 204 to communicate with other equipment via the network 30.

The agent providing system 1 is configured as described above. Hereinafter, details of processes executed by the agent providing system 1 will be described.

(Uniqueness of Appearance or Voice of Agent)

Incidentally, in the cyberspace, the uniqueness of the appearance (figure) of an agent held by a particular user serves as an identifier when viewed from another user. Accordingly, this uniqueness of the appearance is supposed to play an important role in inputting and outputting information in the cyberspace.

That is, the appearance of the agent guarantees that the information is permitted to be passed to the user of the agent. Furthermore, the appearance of the agent is also a basis for the reliability of the information offered by the user of the agent.

In this manner, in providing the agent, the uniqueness of the appearance of the agent is an important clue in the reliability of the information and the handover of the information. Therefore, the uniqueness of the appearance of the agent in the cyberspace is an important issue.

In recent years, agents in the cyberspace have begun to have figures of characters or the like. Meanwhile, in the future, agents or avatars as own virtual selfs of users would be likely to grow in number beyond the real world population.

In such a situation, unlike a human (user) in the real space, the uniqueness of the appearance of the agent becomes more important, including, for example, how diversely the figure of the agent in which the element of expression is involved will be drawn in the cyberspace. Furthermore, this similarly applies to the uniqueness of the voice of the agent.

Thus, the agent providing system 1 is configured to, when newly providing an agent to a cyberspace that allows a plurality of agents to be registered, provide an agent that is separated by a certain amount or more in terms of appearance or voice from an agent already registered in the cyberspace.

With this configuration, the uniqueness of the appearance or voice of each agent is ensured in the cyberspace. As a result, a more suitable agent can be provided.

Specifically, it is possible to clearly discriminate between an agent of a particular user and an agent of another user.

Furthermore, for example, even in a situation in which a particular user switches a plurality of agents to be used depending on purposes, it is possible to prevent an occurrence of an error such as confirming a tomorrow's schedule with an agent who is specialized in music recommendation, because the agent can be clearly discriminated because of the uniqueness of the appearance of the agent.

Here, as a method of generating a unique appearance (figure), for example, there is a method as illustrated in FIG. 5.

That is, as illustrated in FIG. 5, if attention is paid to the eyes as a part of the face of the agent, parameters such as a type, a size, and a relative position in the face can be set. However, if the user freely sets the parameters, there is a possibility that an unexpected figure such as an eye going out of the face may be generated, and thus the parameters can be restricted with a maximum value, a minimum value, and the like.

More specifically, examples of the eye type include round eyes, roundish-almond eyes, almond eyes, thin almond eyes, droopy eyes, droopy hooded eyes, hooded eyes, Asian eyes, and childish/round Asian eyes.

Such eye types are prepared in advance as basic patterns, and variations of eye parts can be increased by multiplying the eyes of the basic patterns by a coefficient of the sizes.

Similarly, for parts other than the eyes, such as the mouth and the nose, parameters such as the type, size, and relative position in the face can be set (FIG. 5).

In generating the face of the agent, for example, parameters of each part can be randomly selected and set such that a face similar to the face of another agent (a relatively resembling face) is not generated.

At this time, in a case where a combination same as (or similar to) the combination of parameters of a face generated in the past is selected, parameters are selected again. Then, once a state without a face having the same (or a similar) parameter combination is reached, the generation of the face of the agent is simply completed.

Note that the agent can be expressed by a two-dimensional (2D) image or a three-dimensional (3D) image. Furthermore, the voice of the agent will be described later with reference to FIG. 26 and other drawings.

(Overall Picture of Process)

Figure 7:
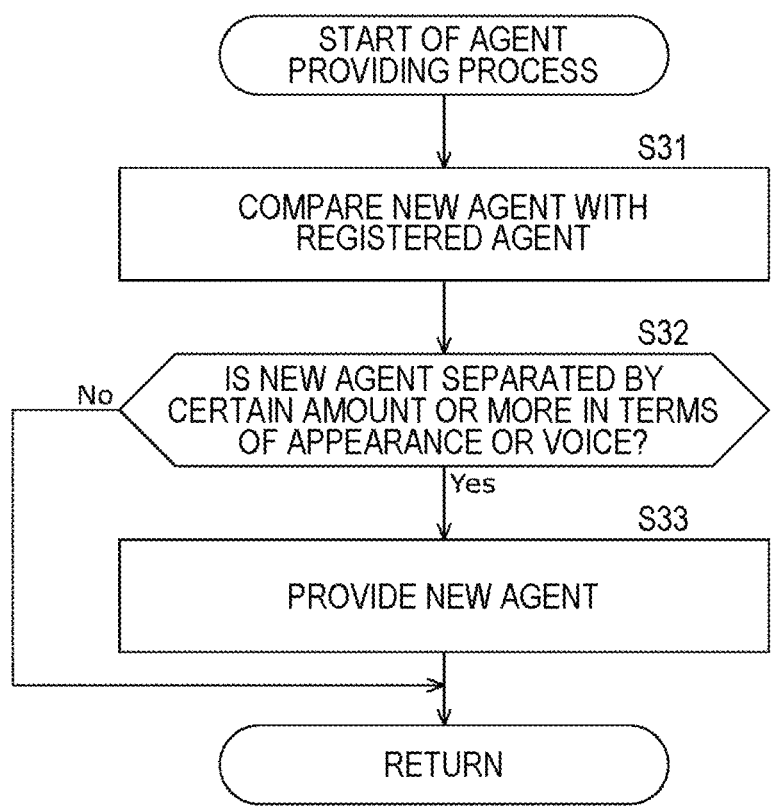
FIG. 7 is a flowchart explaining a flow of a first example of details of the agent providing process.
Figure 8:
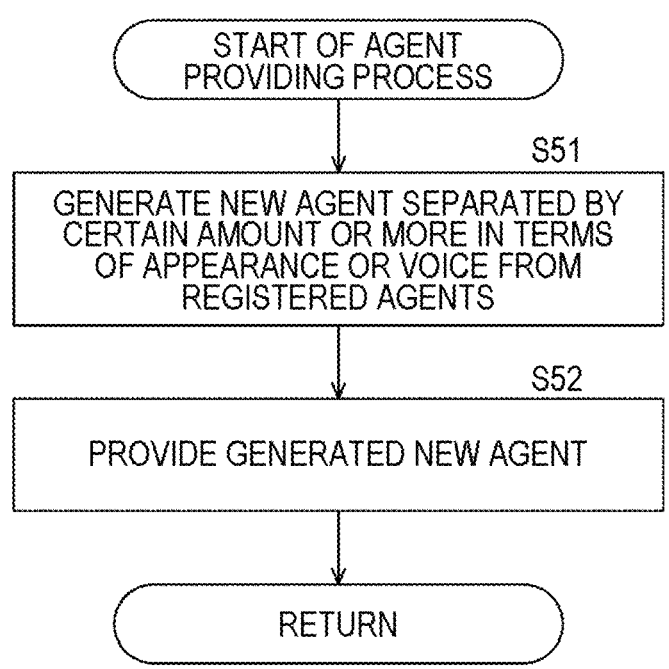
FIG. 8 is a flowchart explaining a flow of a second example of details of the agent providing process.

Next, an overall picture of the agent providing process in the first embodiment will be described with reference to the flowcharts in FIGS. 6 to 8.

This agent providing process is implemented by the action of the information terminal 10 (the control unit 100 of the information terminal 10) or the server 20 (the control unit 200 of the server 20), or the actions of the information terminal 10 (the control unit 100 of the information terminal 10) and the server 20 (the control unit 200 of the server 20) in cooperation with each other.

That is, this agent providing process is executed by at least one control unit of the control unit 100 and the control unit 200. In the following description, for the sake of simplicity of description, a case where the agent providing process is executed by the control unit 200 will be exemplified, but the whole or a part of the process may be executed by the control unit 100.

In step S11, the control unit 200 determines whether or not to newly provide an agent to the cyberspace.

In a case where it is determined to be affirmative ("Yes") in the determination process in step S11, the process proceeds to step S12. In step S12, the control unit 200 executes the agent providing process.

In this agent providing process, an agent separated by a certain amount or more in terms of appearance or voice from agents already registered in the cyberspace (an agent whose uniqueness of the appearance or voice is ensured) is provided.

Note that details of the agent providing process will be described later with reference to the flowcharts in FIGS. 7, 8, 10, and 23.

Figure 6:
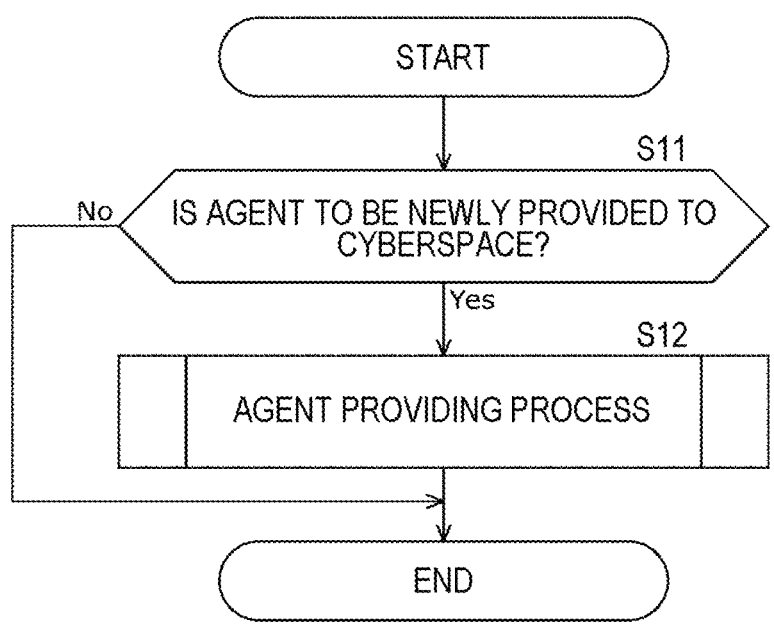
FIG. 6 is a flowchart explaining a flow of an agent providing process.

In a case where the process in step S12 ends or it is determined to be negative ("No") in the determination process in step S11, the agent providing process in FIG. 6 ends.

Here, a first example of details of the agent providing process corresponding to the process in step S12 in FIG. 6 will be described with reference to the flowchart in FIG. 7.

In step S31, the control unit 200 compares the new agent with an agent already registered in the cyberspace.

In step S32, the control unit 200 determines whether or not the new agent is separated by a certain amount or more in terms of appearance or voice from the agent already registered in the cyberspace, on the basis of the result of the comparison in the process in step S31.

As an algorithm for executing the comparison and determination process, diverse arithmetic methods can be used, and for example, a Euclidean distance and threshold value determination can be used.

That is, in the case of the appearance (figure), a multidimensional vector is constructed with each parameter relating to the face shape, face part, body shape, skin color, gender, clothes, hairstyle, and the like, such as, when the face part is taken up, each of its dimensions, shape, distances to other parts, luminance, and color, as its one parameter (one element), and the features of the appearance are expressed by the multidimensional vector.

Furthermore, in the case of voice (audio), a multidimensional vector is made with each of not only frequency characteristics but also prosody (tone of voice), intonation, rhythm, feature in the way of speaking, and the like, as one parameter (one element), and the features of the voice are expressed by the multidimensional vector.

Then, the Euclidean distance between two multidimensional vectors is taken, and the comparison and determination process can be performed according to whether or not the distance is equal to or greater than a predetermined threshold value.

Here, for example, in a case where the Euclidean distance is equal to or greater than the threshold value, it is determined that there is a separation by a certain amount or more in terms of appearance or voice. In this case, the appearance or voice is not similar, and it can also be said to be dissimilar. In other words, "being separated by a certain amount or more in terms of appearance or voice" means "being dissimilar in appearance or voice".

On the other hand, for example, in a case where the Euclidean distance is less than the threshold value, it is determined that there is no separation by a certain amount or more in terms of appearance or voice. In this case, it can be said to be similar in appearance or voice. In other words, "not being separated by a certain amount or more in terms of appearance or voice" means "being similar in appearance or voice".

Note that the case of "not being separated by a certain amount or more in terms of appearance or voice" includes the case of having the same appearance or voice. Furthermore, in the comparison and determination process to be described later, similarly to step S32, the Euclidean distance and the threshold value determination can be used. Here, a case where the Euclidean distance and the threshold value determination are used as the comparison and determination process has been exemplified, but other known approaches may be used.

In a case where it is determined in step S32 that there is a separation by a certain amount or more in terms of appearance or voice, the process proceeds to step S33. In step S33, the control unit 200 provides a new agent to the cyberspace.

On the other hand, in a case where it is determined in step S32 that there is no separation by a certain amount or more in terms of appearance or voice, the process in step S33 is skipped. In other words, in this case, a new agent will not be provided to the cyberspace.

In a case where the process in step S33 ends or it is determined to be negative ("No") in the determination process in step S32, the process returns to step S12 in FIG. 6, and the processes in step S12 and the subsequent steps are executed.

As described above, since an agent separated by a certain amount or more in terms of appearance or voice from agents already registered in the cyberspace is provided as a new agent, the agent providing system 1 can provide an agent whose uniqueness of the appearance or voice is ensured.

Next, a second example of details of the agent providing process corresponding to the process in step S12 in FIG. 6 will be described with reference to the flowchart in FIG. 8.

In step S51, the control unit 200 generates a new agent separated by a certain amount or more in terms of appearance or voice from agents already registered in the cyberspace.

In step S52, the control unit 200 provides the generated new agent to the cyberspace.

When the process in step S52 ends, the process returns to step S12 in FIG. 6, and the processes in step S12 and the subsequent steps are executed.

As described above, since an agent separated by a certain amount or more in terms of appearance or voice from agents already registered in the cyberspace is generated as a new agent, the agent providing system 1 can provide an agent whose uniqueness of the appearance or voice is ensured.

2. Second Embodiment

Incidentally, as the cyberspace in which the agent is registered, there are a private cyberspace accessible by a specified user, a public cyberspace accessible by, for example, an agent application and a plurality of any users, such as a virtual reality (VR) space, and the like. Here, a case where an agent separated by a certain amount or more from the appearance or voice of an agent used by a specified user is provided in the private cyberspace will be described.

(Example of Selecting Appearance and Voice)

Figure 9:
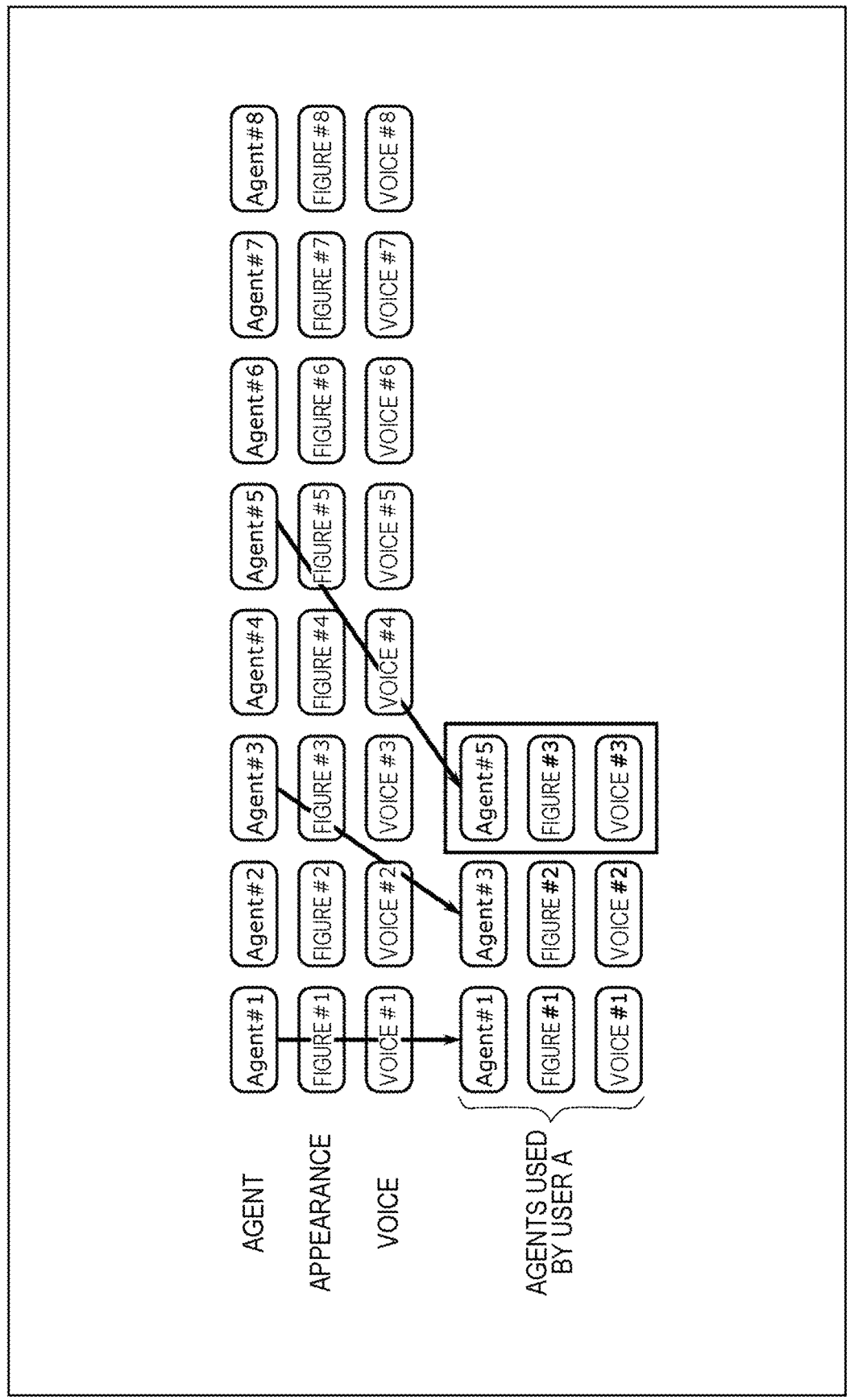
FIG. 9 is a diagram illustrating a first example of selecting the appearance and voice of an agent.

FIG. 9 is a diagram illustrating a first example of selecting the appearance and voice of an agent.

In FIG. 9, the appearance and voice assigned to each agent are illustrated, but the agent (the principal body of the agent) and the appearance and voice of the agent can be disconnected from each other.

Specifically, although a figure #1 and a voice #1 are assigned to an agent #1 (Agent #1) by default according to the place of the agent #1 in the order, since the appearance and voice of the agent #1 can be disconnected, the agent #1 can be assigned with a figure and a voice with other numbers, as well as the figure #1 and the voice #1, when the agent #1 is provided.

Similarly, for agents #2 to #8, each agent is assigned with its own figure and voice according to its place in the order, but the agent (the principal body of the agent) and the appearance and voice of the agent can be disconnected, and a figure and a voice with other numbers can be assigned.

At this time, an occasion when the agent #5 is newly provided in a case where the agents #1 and #3 are registered in the private cyberspace as agents used by a user A who is a specified user is assumed.

However, the figure #1 and the voice #1 according to the default order are assigned to the agent #1. The agent #3 is assigned with a figure #2 and a voice #2 against the order. The figure #1 and the voice #1 and the figure #2 and the voice #2 are separated by a certain amount or more.

Here, the agent #5 to be newly provided for the user A can be assigned with a figure #3 and a voice #3 separated by a certain amount or more from the figure #1 and the voice #1 of the agent #1 and the figure #2 and the voice #2 of the agent #3.

In this manner, since the agent (the principal body of the agent) and the appearance and voice of the agent can be disconnected, any combination of figure and voice can be applied to the agent, and it is thus not necessary to prepare figures and voices by the number of agents. This allows to decrease (the number of) figures and voices with respect to (the number of) agents, and it is thus possible to reduce the cost when providing the agent.

Note that, for example, in a case where the user uses a plurality of agent applications, a private cyberspace of each of the plurality of agent applications may be regarded as a single private cyberspace, and the appearance or voice of the agent used in the single private cyberspace may be controlled so as to be separated by a certain amount or more.

(Overall Picture of Process)

Next, an overall picture of an agent providing process in the second embodiment will be described with reference to the flowchart in FIG. 10. Note that the agent providing process in FIG. 10 corresponds to the process in step S12 in FIG. 6.

In step S71, a control unit 200 determines whether or not to newly provide an agent for a specified user to the private cyberspace.

In a case where it is determined to be affirmative in the determination process in step S71, the process proceeds to step S72. In step S72, the control unit 200 executes a specified agent providing process.

In this specified agent providing process, an agent separated by a certain amount or more from the appearances or voices of agents that are already registered in the private cyberspace and used by the specified users (an agent whose uniqueness of the appearance or voice is ensured) is provided.

Figure 13:
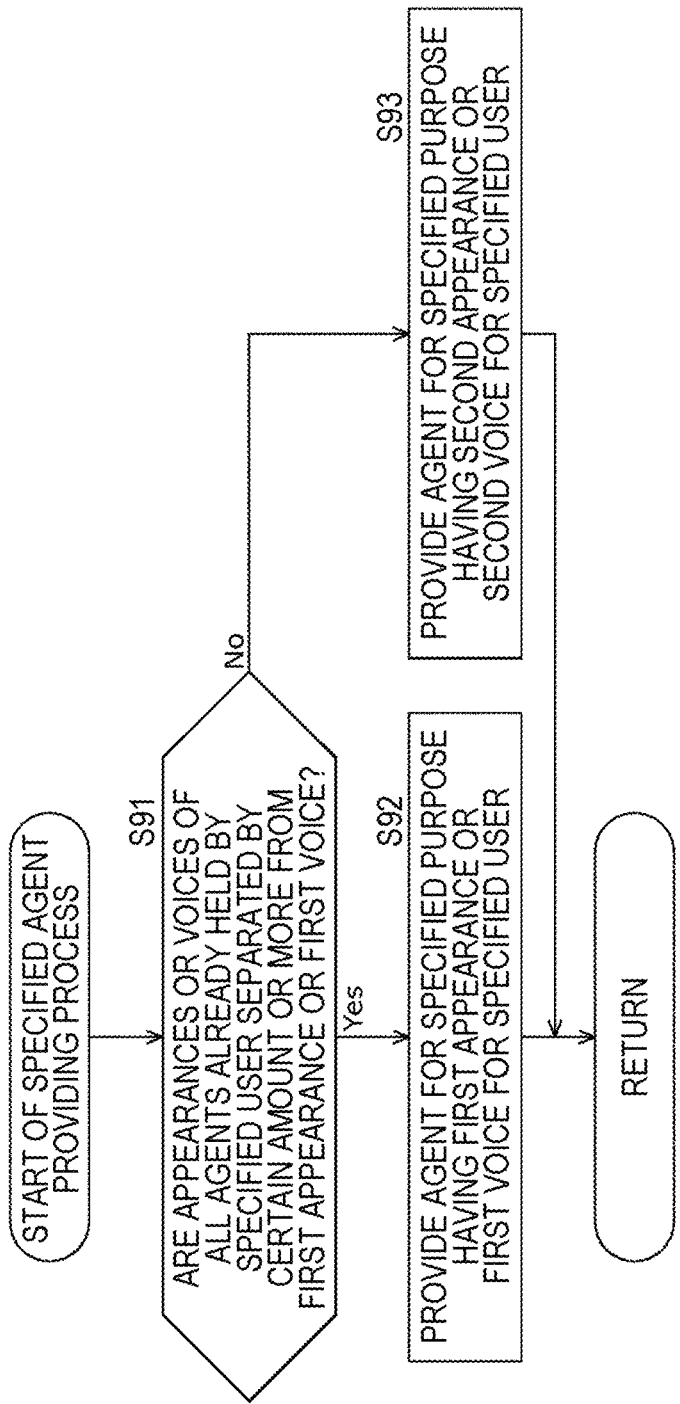
FIG. 13 is a flowchart explaining a flow of a first example of details of a specified agent providing process.
Figure 15:
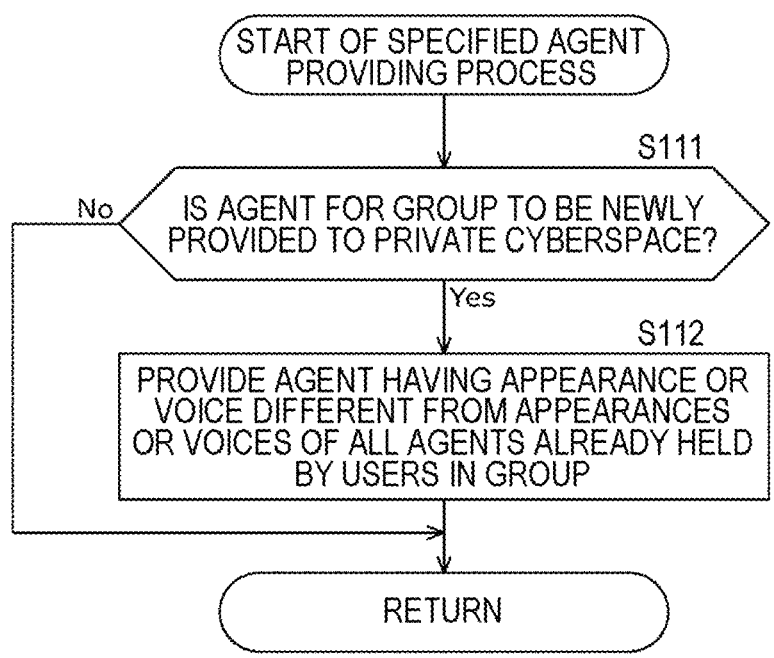
FIG. 15 is a flowchart explaining a flow of a second example of details of the specified agent providing process.
Figure 18:
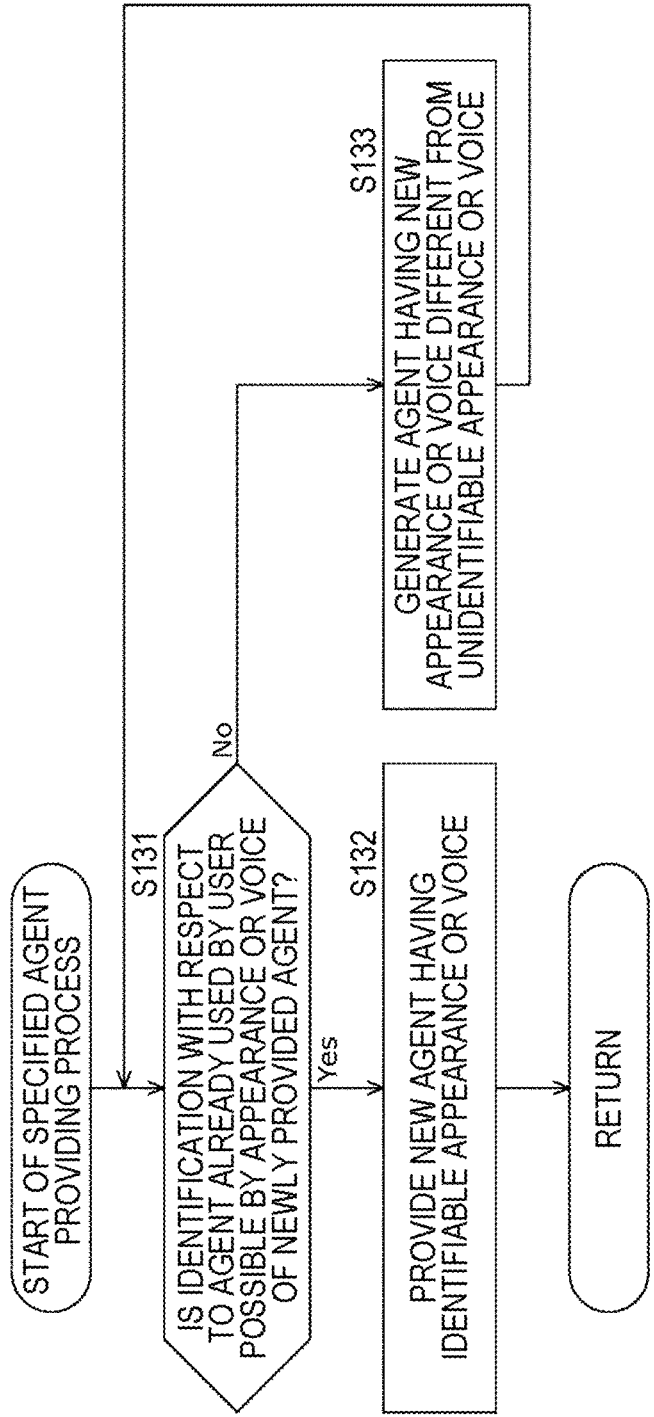
FIG. 18 is a flowchart explaining a flow of a third example of details of the specified agent providing process.

Note that details of the specified agent providing process will be described later with reference to the flowcharts in FIGS. 13, 15, and 18.

In a case where the process in step S72 ends or it is determined to be negative in the determination process in step S71, the process returns to the process in step S12 in FIG. 6, and the processes in step S12 and the subsequent steps are executed.

As described above, when newly providing an agent for the specified user to the private cyberspace, since an agent separated by a certain amount or more from the appearance or voice of an agent that is already registered in the private cyberspace and used by this specified user is provided, an agent providing system 1 can provide an agent whose uniqueness in appearance or voice is ensured in the private cyberspace.

In the present embodiment, it is supposed that the appearance and voice of the agent can be disconnected. However, in a case where a character already widely recognized or a famous animation character is registered as an agent, in principle, the appearance or voice of the character cannot be disconnected. Therefore, when such an agent whose appearance and voice cannot be disconnected is newly registered, in a case where such an agent is similar to an already registered agent whose appearance and voice can be disconnected, the assignment of the appearance and voice of the already registered agent may be adjusted.

3. Third Embodiment

Even the same agent may have different appearances (figures) or voices for each user. Specifically, in a case where the user A and a user B personally use the same music recommendation agent, the music recommendation agent used by the user A and the music recommendation agent used by the user B will have different appearances (figures) or voices.

(Example of Selecting Appearance and Voice)

Figure 11:
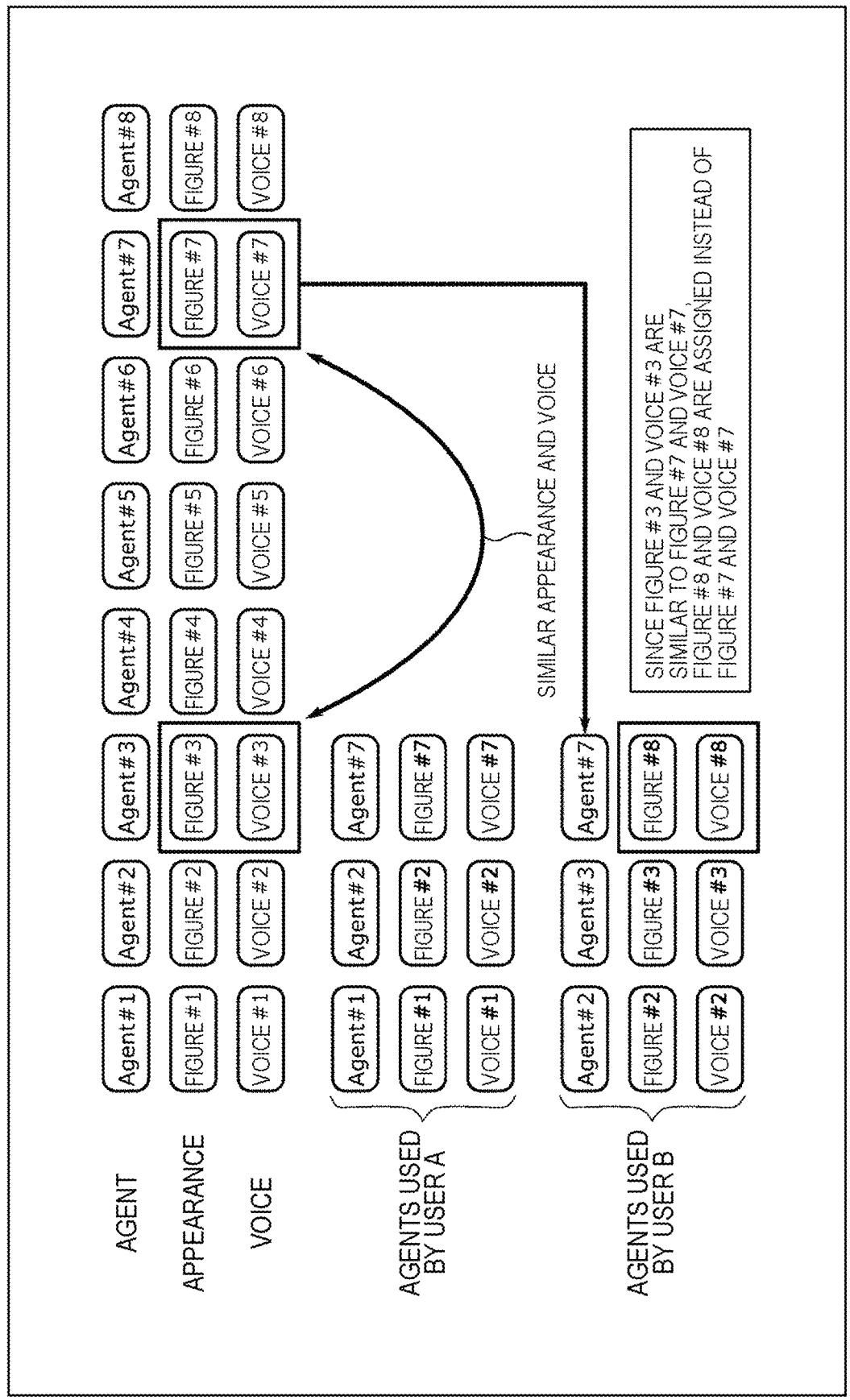
FIG. 11 is a diagram illustrating a second example of selecting the appearance and voice of an agent.

FIG. 11 illustrates a second example of selecting the appearance and voice of an agent.

In FIG. 11, as in FIG. 9 described above, each of agents #1 to #8 is assigned with a figure and a voice according to its place in the order by default, but the agent (the principal body of the agent) and the appearance and voice of the agent can be disconnected, and a figure and a voice with other numbers can be assigned.

Here, in a case where agents #1 and #2 are already registered as agents used by the user A, an occasion when an agent #7 for a specified purpose, such as a music recommendation agent, is provided to the user A is assumed.

However, in FIG. 11, a figure #7 or a voice #7 is assigned to the agent #7 for a specified purpose by default. Furthermore, a figure #3 and a voice #3 are similar to the figure #7 and the voice #7, respectively (not separated by a certain amount or more).

At this time, the appearances or voices of all the agents #1 and #2 already held by the user A (the figures #1 or the voice #1 and the figure #2 or the voice #2) are separated by a certain amount or more from (not similar to) the figure #7 or the voice #7 of the agent #7 for a specified purpose. Therefore, in this example of the user A, the agent #7 for a specified purpose is provided with the figure #7 or the voice #7 kept.

Meanwhile, in a case where agents #2 and #3 are already registered as agents used by the user B, an occasion when the agent #7 for a specified purpose is provided to the user B is assumed.

At this time, one of the appearances or voices of the agents #2 and #3 already held by the user B (the figures #2 or the voice #2 and the figure #3 or the voice #3) is not separated by a certain amount or more from (is similar to) the figure #7 or the voice #7 of the agent #7 for a specified purpose. Therefore, in this example of the user B, the agent #7 for a specified purpose having not the figure #7 or the voice #7 but a figure #8 or a voice #8 different from the figure #7 or the voice #7 is provided.

Figure 12:
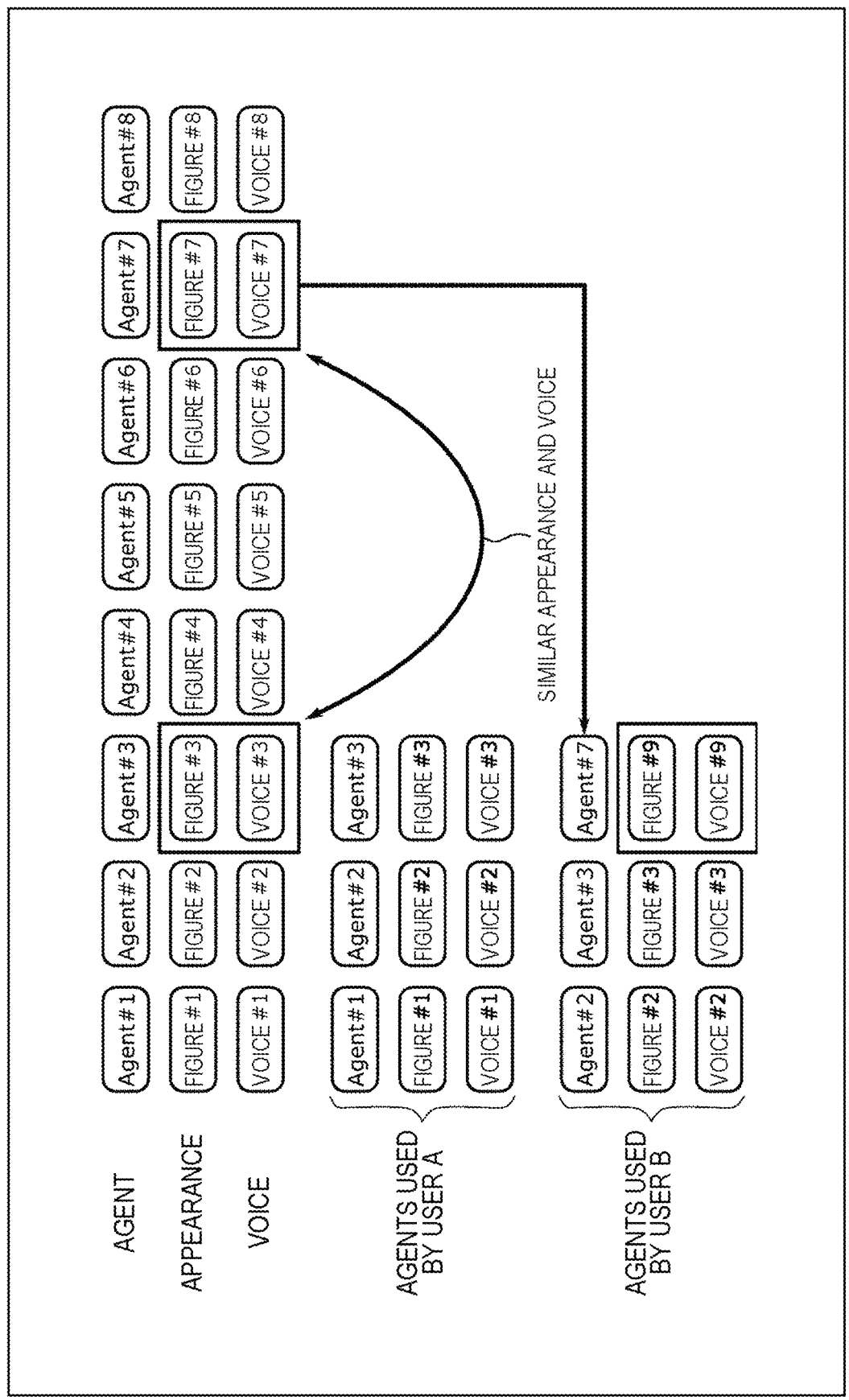
FIG. 12 is a diagram illustrating a third example of selecting the appearance and voice of an agent.

Furthermore, FIG. 12 illustrates a third example of selecting the appearance and voice of an agent.

In FIG. 12, in a case where the agents #2 and #3 are already registered as agents used by the user B, when the agent #7 for a specified purpose is provided to the user B, the default figure #7 or voice #7 is similar to the figure #3 or voice #3. Therefore, not the default figure #7 or voice #7 but a figure #9 or a voice #9 is assigned to the agent #7 for a specified purpose.

Note that the figure #9 or the voice #9 represents a separately prepared figure or voice that is not illustrated, but it is also possible to assign, for example, the figure #8 or the voice #8.

(Overall Picture of Process)

Next, an overall picture of an agent providing process in the third embodiment will be described with reference to the flowchart in FIG. 13. Note that the specified agent providing process in FIG. 13 corresponds to the process in step S72 in FIG. 10.

In step S91, a control unit 200 determines whether or not the appearances or voices of all the agents already held by the specified user are separated by a certain amount or more from a first appearance or a first voice of an agent for a specified purpose, such as a music recommendation agent.

In a case where it is determined to be affirmative in the determination process in step S91, the process proceeds to step S92. In step S92, the control unit 200 provides the agent for a specified purpose having the first appearance or the first voice for the specified user.

Specifically, when the agent #7 for a specified purpose is provided for the user A, since the figure #1 or the voice #1 and the figure #2 or the voice #2 of all the agents #1 and #2 already held by the user A are separated by a certain amount or more from the figure #3 or the voice #3 of the agent #7 for a specified purpose, the agent #7 for a specified purpose is provided with the figure #7 or the voice #7 kept (the example of the user A in FIG. 11).

On the other hand, in a case where it is determined to be negative in the determination process in step S91, that is, when one of the appearances or voices of the agents already held by the specified user is not separated by a certain amount or more from (is similar to) the first appearance or the first voice of the agent for a specified purpose, the process proceeds to step S93.

In step S93, the control unit 200 provides the agent for a specified purpose having a second appearance or a second voice different from the first appearance or the first voice for the specified user.

Specifically, when the agent #7 for a specified purpose is provided for the user B, since one of the figure #2 or the voice #2 and the figure #3 or the voice #3 of the agents #2 and #3 already held by the user B is not separated by a certain amount or more from the figure #7 or the voice #7 of the agent #7 for a specified purpose, the agent #7 for a specified purpose having not the figure #7 or the voice #7 but the figure #8 or the voice #8 is provided (the example of the user B in FIG. 11).

Figure 10:
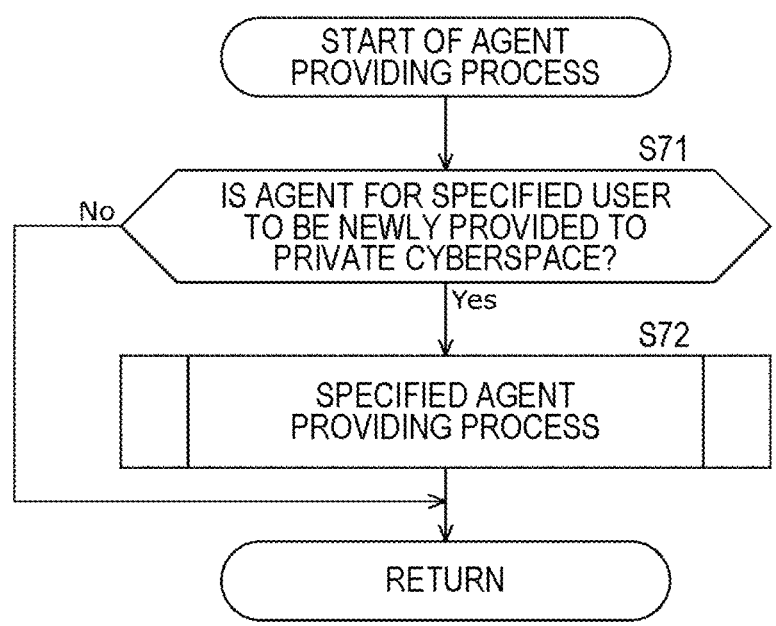
FIG. 10 is a flowchart explaining a flow of a third example of details of the agent providing process.

When the process in step S92 or S93 ends, the process returns to the process in step S72 in FIG. 10, and the processes in step S72 and the subsequent steps are executed.

As described above, when providing an agent for a specified purpose in which the uniqueness of the appearance or voice is ensured, since the appearance or voice of the agent can be changed for each user even for the same agent, an agent providing system 1 can provide an agent adapted to the user.

4. Fourth Embodiment

In the cyberspace, a case where an agent for a group to which a plurality of users belongs is used in the group is also assumed. Here, a case where a group agent taking the appearance (figure) or voice into account is provided in the private cyberspace will be described.

(Example of Selecting Appearance and Voice)

Figure 14:
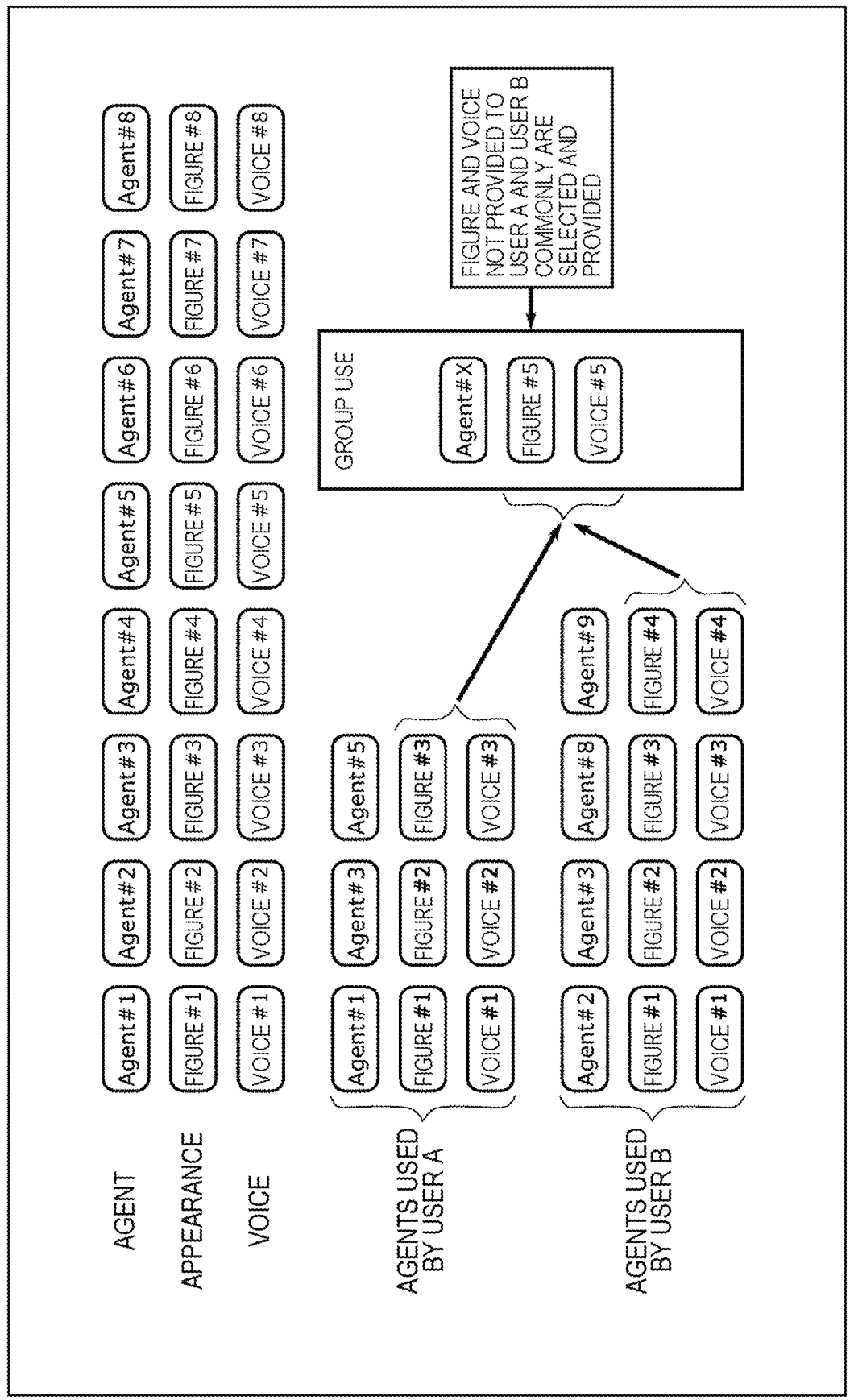
FIG. 14 is a diagram illustrating a fourth example of selecting the appearance and voice of an agent.

FIG. 14 illustrates a fourth example of selecting the appearance and voice of an agent.

In FIG. 14, as in FIG. 9 and other drawings described above, each of agents #1 to #8 is assigned with a figure and a voice according to its place in the order by default, but the agent (the principal body of the agent) and the appearance and voice of the agent can be disconnected, and a figure and a voice with other numbers can be assigned.

Here, two users, namely, a user A and a user B, belong to the same group in the private cyberspace, and each of the users A and B has already registered an own agent to personally use.

As the agents used by the user A, agents #1, #3, and #5 (a figure #1 and a voice #1, a figure #2 and a voice #2, and a figure #3 and a voice #3) have already been registered. As the agents used by the user B, agents #2, #3, #8, and #9 (a figure #1 and a voice #1, a figure #2 and a voice #2, a figure #3 and a voice #3, and a figure #4 and a voice #4) have already been registered.

At this time, a case where an agent #X for the group is to be provided is assumed. In providing this agent #X for the group, a figure and a voice different from figures and voices of all the agents already held by the users A and B in the group are to be assigned.

That is, since a figure #5 and a voice #5 are not assigned to the agents #1, #3, and #5 used by the user A and the agents #2, #3, #8, and #9 used by the user B, and the figure and the voice of each agent used by the users A and B are separated by a certain amount or more from the figure #5 and the voice #5, the figure #5 and the voice #5 can be assigned to the agent #X for the group.

With this assignment, when an agent for the group to which the users A and B belong is newly provided into the private cyberspace, it is possible to provide the agent for the group that is separated by a certain amount or more in terms of appearance or voice from the agents already held by the users A and B.

(Overall Picture of Process)

Next, an overall picture of an agent providing process in the fourth embodiment will be described with reference to the flowchart in FIG. 15. Note that the specified agent providing process in FIG. 15 corresponds to the process in step S72 in FIG. 10.

In step S111, a control unit 200 determines whether or not to newly provide an agent for a group to the private cyberspace.

In a case where it is determined to be affirmative in the determination process in step S111, the process proceeds to step S112. In step S112, the control unit 200 provides an agent having an appearance or a voice different from appearances or voices of all the agents already held by the users in the group.

Specifically, when the agent for the group to which the users A and B belong is provided, the agent for the group having the figure #5 and the voice #5 different from the figures and voices (the figure #1 and the voice #1, the figure #2 and the voice #2, and the figure #3 and the voice #3) of the agents already held by the user A and the figures and voices (the figure #1 and the voice #1, the figure #2 and the voice #2, the figure #3 and the voice #3, and the figure #4 and the voice #4) of the agents already held by the user B is provided (the example in FIG. 14).

In a case where the process in step S112 ends or it is determined to be negative in the determination process in step S111, the process returns to the process in step S72 in FIG. 10, and the processes in step S72 and the subsequent steps are executed.

As described above, when newly providing an agent for a group into the private cyberspace, an agent providing system 1 can provide the agent for the group that is separated by a certain amount or more in terms of appearance or voice from agents already held by users in the group.

5. Fifth Embodiment

When a new agent is to be provided, whether or not the appearance (figure) or voice of the new agent is identifiable may be confirmed with the user such that an agent having an identifiable appearance (figure) or voice is provided according to the result of the confirmation.

First Example

Figure 16:
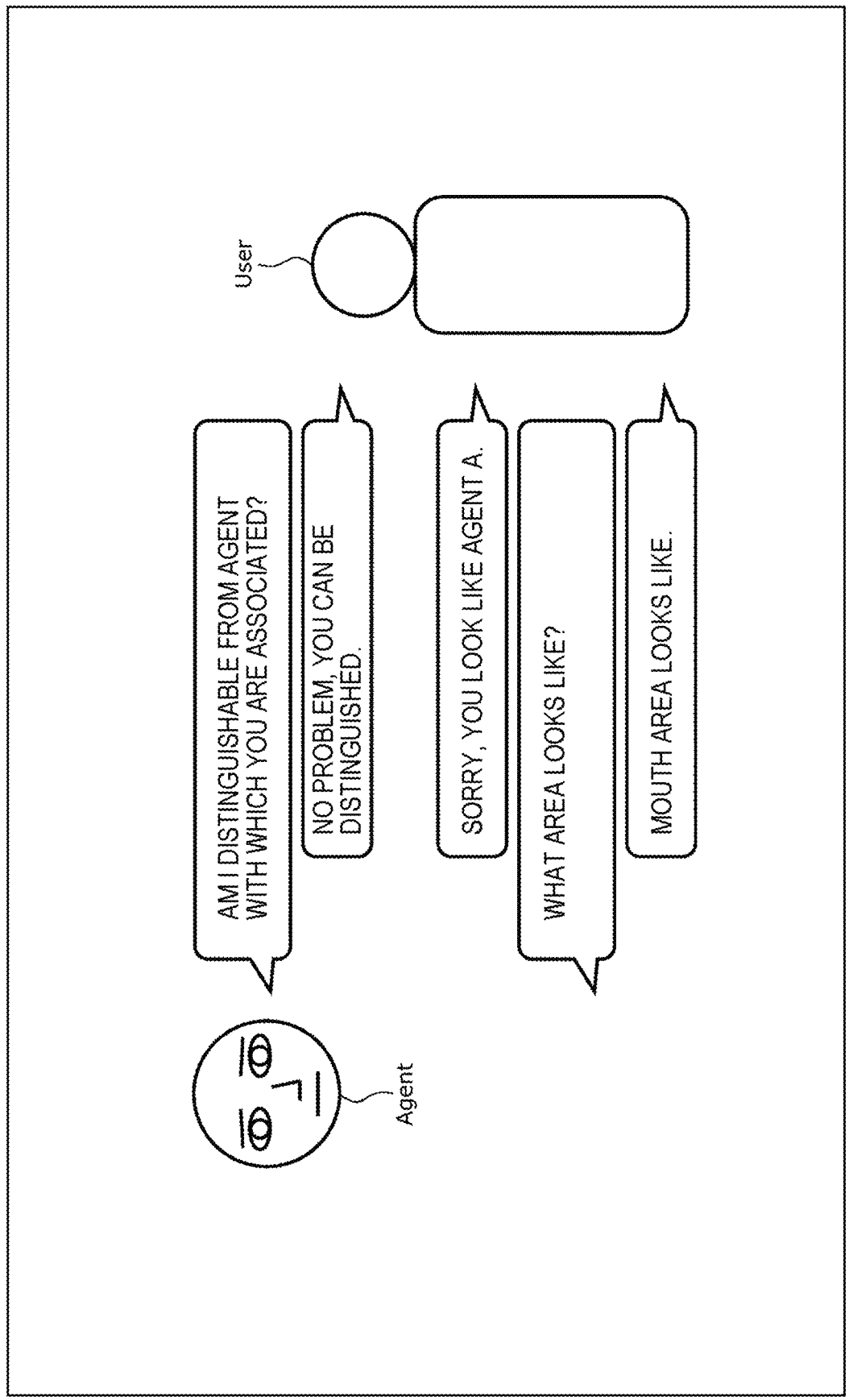
FIG. 16 is a diagram illustrating a first example in a case where identification confirmation for an appearance of a new agent is performed in an interactive manner.

FIG. 16 illustrates an example of interaction between an agent and a user when identification confirmation for the appearance (figure) of a new agent is performed.

Agent: "Am I distinguishable from the agent with which you are associated?"
User: "No problem, you can be distinguished."
User: "Sorry, you look like the agent A."
Agent: "What area looks like?"
User: "The mouth area looks like."

In this first example, a part of the face of another agent that is considered to look like the part of the face of the new agent is specified through the interaction between the agent and the user. An agent providing system 1 acquires this information regarding "what looks like", thereby being able to present an agent in which the acquired information is reflected again.

For example, in the agent providing system 1, parameters of parts of faces that are considered to look like through the interaction are compared between the new agent and another agent, and a relationship between coefficients is analyzed. Furthermore, in the agent providing system 1, on the supposition that the sensitivity of the user to the part of the face considered to look like is high, the unlikeliness in this part (differences in parameters) is to be made larger in the figure of a new agent to be presented (re-presented) thereafter.

More specifically, since it has been specified that the mouth portion of the new agent looks like the mouth portion of another agent in the interaction between the agent and the user described above, the figure is changed such that, in particular, the mouth portion looks unlike the mouth portion of another agent when the new agent is re-presented.

Second Example

Figure 17:
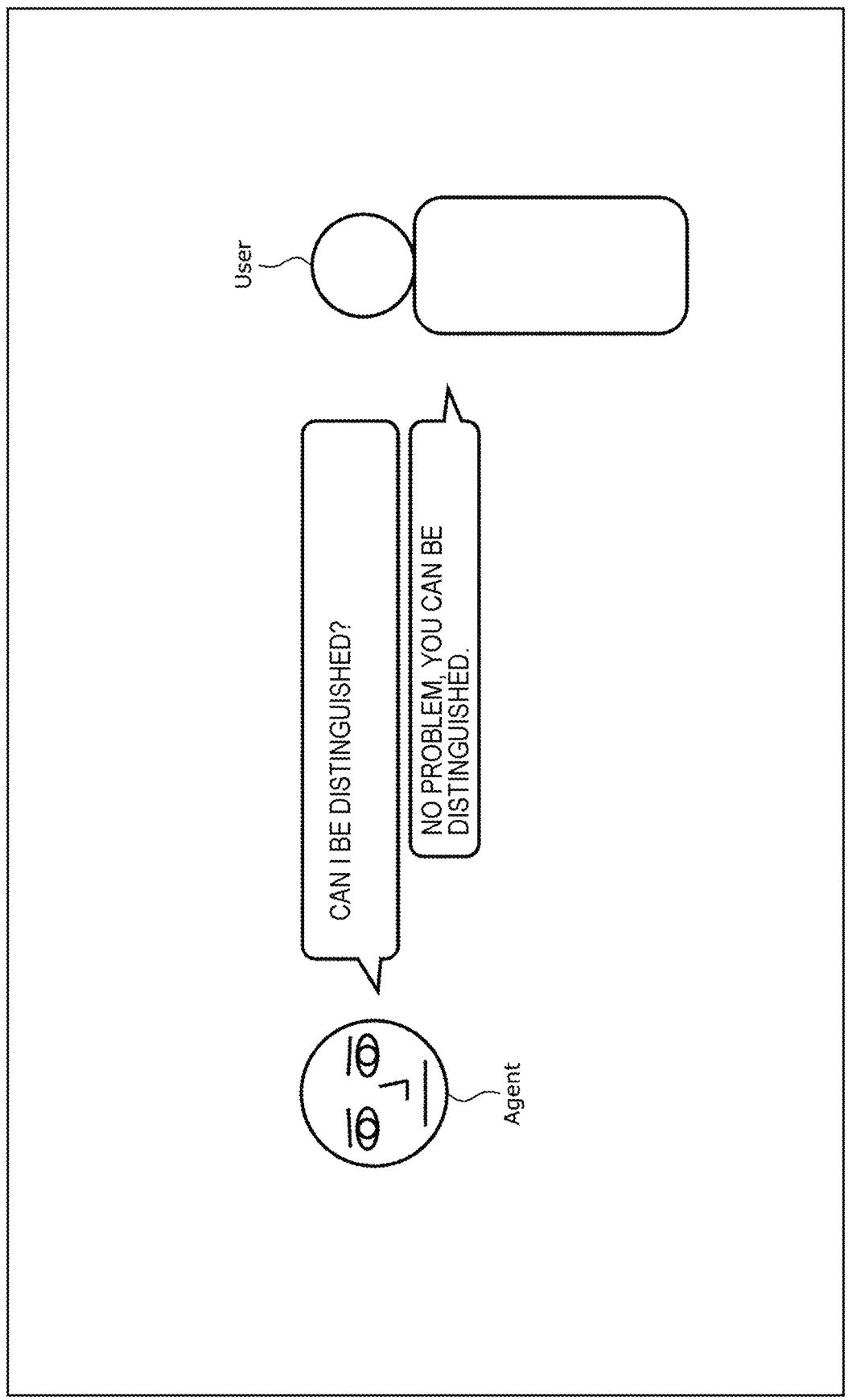
FIG. 17 is a diagram illustrating a second example in a case where identification confirmation for an appearance of a new agent is performed in an interactive manner.

FIG. 17 illustrates an example of interaction between an agent and a user when reconfirmation of the appearance (figure) of a new agent is performed.

Agent: "Can I be distinguished?"
User: "No problem, you can be distinguished."

In the second example, when the new agent in which the interaction between the agent and the user in the first example in FIG. 16 described above is reflected is re-presented, the user remarks that the new agent in which, in particular, the figure of the mouth portion has been changed can be distinguished from another agent.

In this manner, in a case where the figure of the re-presented new agent is separated by a certain amount or more from (does not look like) the figure of another agent, the re-presented new agent is fixed as an agent to be provided to the user.

On the other hand, in a case where the figure of the re-presented new agent is not separated by a certain amount or more from (looks like) the figure of another agent, the presentation of the new agent whose figure has been changed is repeated by further appropriately changing parameters for each part, and a new agent that does not look like another agent for the user is to be presented.

Note that the interaction between the agent and the user illustrated in FIGS. 16 and 17 may be performed by, for example, audio using voice chat, in addition to text chat by displaying a message exchanged in real time on the screen of the information terminal 10, for example.

(Overall Picture of Process)

Next, an overall picture of an agent providing process in the fifth embodiment will be described with reference to the flowchart in FIG. 18. Note that the specified agent providing process in FIG. 18 corresponds to the process in step S72 in FIG. 10.

In step S131, a control unit 200 determines whether or not identification with respect to the agent already used by the user based on the appearance or voice of a newly provided agent is possible.

In a case where it is determined to be affirmative in the determination process in step S131, the process proceeds to step S132. In step S132, the control unit 200 provides the new agent having the identifiable appearance or voice.

On the other hand, in a case where it is determined to be negative in the determination process in step S131, the process proceeds to step S133. In step S133, the control unit 200 generates an agent having a new appearance or voice different from the unidentifiable appearance or voice.

When the process in step S133 ends, the process returns to step S131. Then, in the determination process in step S131, it is determined again whether or not identification with respect to the agent already used by the user based on the new appearance or voice is possible, and the loop in steps S133 and S131 is repeated until it is determined that identification is possible ("Yes" in S131).

Then, in a case where it is determined that identification based on the new appearance or voice is possible, an agent having the determined identifiable new appearance or voice is provided as a new agent.

Specifically, in a case where it has been specified that the mouth portion of the new agent looks like the mouth portion of another agent in the interaction between the agent and the user, an agent whose figure has been changed such that, in particular, the mouth portion looks unlike the mouth portion of another agent is re-presented. Then, in a case where the figure of the re-presented new agent does not look like the figure of another agent, the re-presented new agent is to be provided (the examples in FIGS. 16 and 17).

When the process in step S132 ends, the process returns to the process in step S72 in FIG. 10, and the processes in step S72 and the subsequent steps are executed.

(Learning Process)

Next, a flow of a learning process will be described with reference to the flowchart in FIG. 19.

In step S151, the control unit 200 acquires an answer from a user as to whether or not the appearance or voice of the newly provided agent is identifiable.

In step S152, the control unit 200 learns characteristics when the user identifies the appearance or voice of the agent, with the answer from the user as teacher data. Here, for example, the answers of the user in the interaction between the agent and the user illustrated in FIGS. 16 and 17 can be used as the teacher data.

As an approach for this learning, for example, a neural network and machine learning such as deep learning are used.

The neural network is a model imitating a human cranial nerve circuit and is made up of three types of layers, namely, an input layer, an intermediate layer (hidden layer), and an output layer. Furthermore, the deep learning is a model using a neural network having a multilayer structure and can learn a complex pattern latent in a large amount of data by repeating learning distinctive for each layer.

In addition, the problem setting for machine learning includes supervised learning, unsupervised learning, semi-supervised learning, reinforcement learning, reverse reinforcement learning, active learning, transfer learning, and the like. In the sixth example, a case where supervised learning is used is exemplified. In the supervised learning, a feature amount is learned on the basis of given labeled learning data (teacher data). This makes it possible to derive a label of unknown data.

Figure 19:
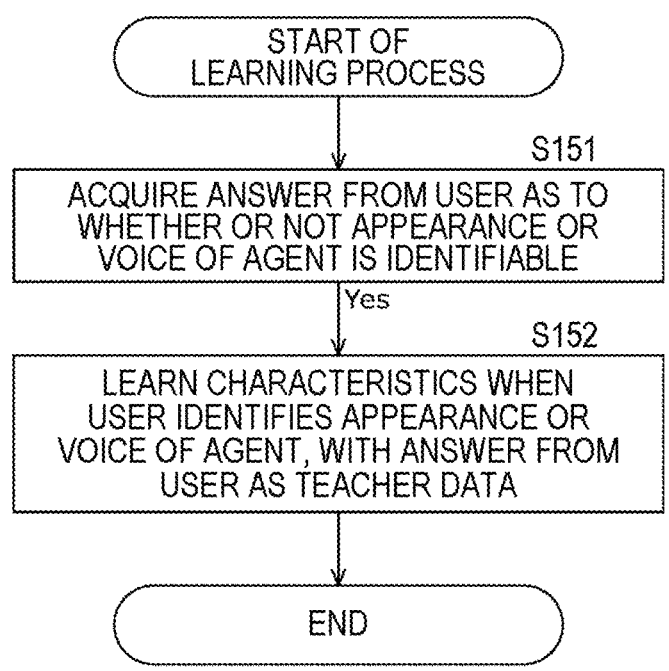
FIG. 19 is a flowchart explaining a flow of a learning process.

When the process in step S152 ends, the learning process in FIG. 19 ends.

As described above, when providing a new agent, since whether or not the appearance or voice of the new agent is identifiable is confirmed with the user, and an agent having an identifiable appearance or voice is provided according to the result of the confirmation, an agent providing system 1 can provide an agent close to the feeling of the user.

Since the result of machine learning can be used when a new agent is generated, an agent having a more clearly identifiable appearance or voice can be generated, as more answers of the user used as teacher data are obtained.

Note that, although the appearance (figure) has been mainly described here in particular, as for the voice, it is only required to similarly confirm with the user whether or not the voice of the new agent is identifiable and perform the specified agent providing process, the learning process, and the like on the basis of the result of the confirmation.

6. Sixth Embodiment

Also in the public cyberspace, it is possible to provide an agent that is separated by a certain amount or more from the appearance or voice of an agent used as an avatar by the specified user.

First Example

Figure 20:
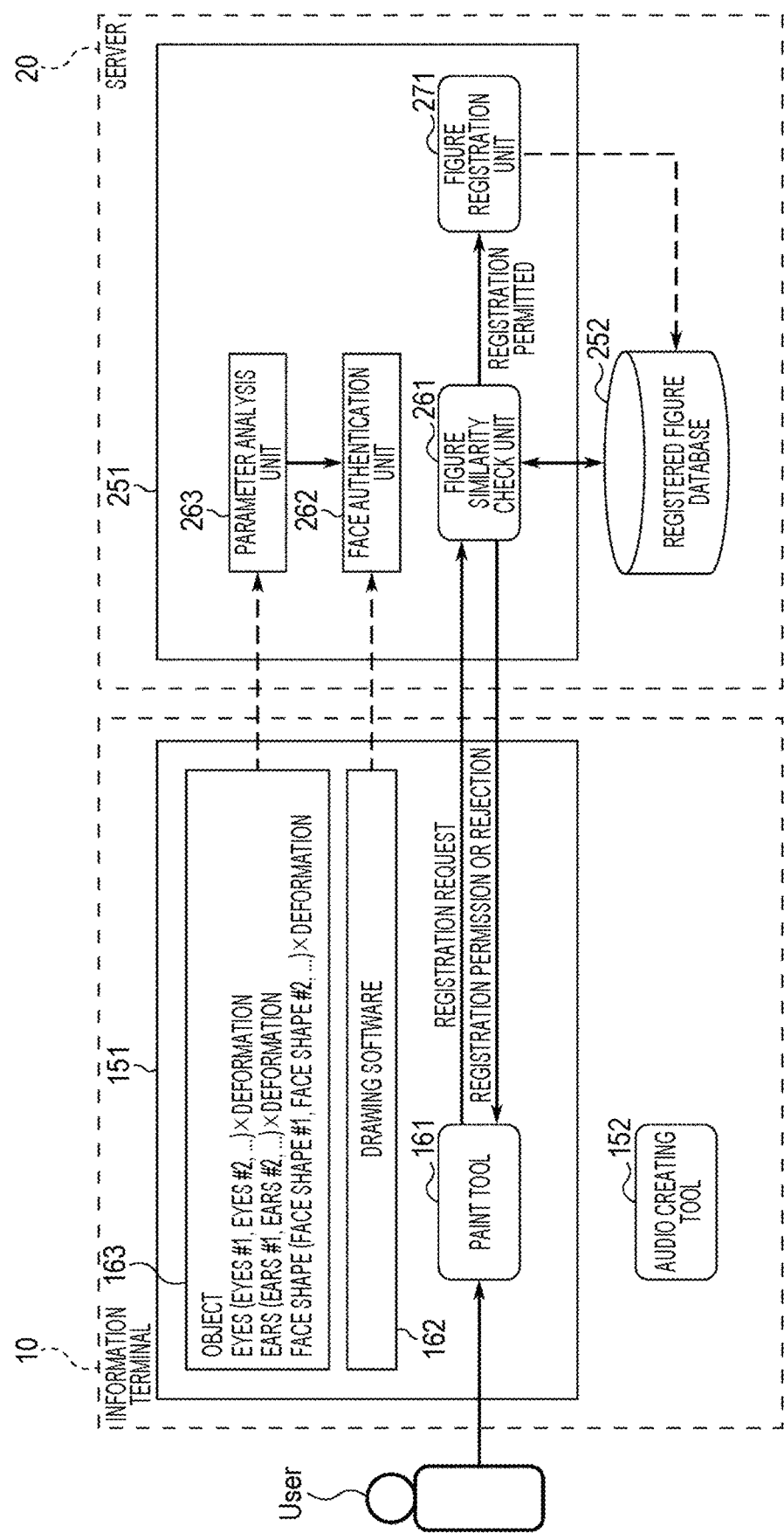
FIG. 20 is a diagram illustrating a first example of a specific configuration of the agent providing system.

FIG. 20 illustrates a first example of a specific configuration of an agent providing system 1.

In FIG. 20, an information terminal 10 and a server 20 exchange various sorts of data, whereby the appearance (figure) or voice (data of the appearance (figure) or voice) of an agent is registered. Here, in the registration of the appearance (figure) and voice of the agent, the registration of the appearance (figure) will be mainly described.

In the information terminal 10, in a case where a figure creating tool 151 or an audio creating tool 152 provided as software is executed by a control unit 100, a graphical user interface (GUI) of these tools is displayed on a display 131. At this time, a user who operates these tools includes a producer (creator) who creates an agent, and the like.

The figure creating tool 151 is a tool for generating the figure of the agent. The audio creating tool 152 is a tool for generating the voice of the agent.

The figure creating tool 151 includes a paint tool 161. The paint tool 161 is graphic software to draw an image (two-dimensional computer graphics (CG) or the like) on a computer, typically using the mouse 121 or the like.

For example, in the paint tool 161, processes such as deformation and modification are performed on various objects 163 (for example, parts of the face, such as the eyes, ears, and face shape) by drawing software 162, and the figure of the agent is generated. The paint tool 161 outputs a message containing a registration request for the generated figure of the agent to a communication unit 104 to send the message to the server 20 via a network 30.

In the server 20, the functions of a figure similarity check unit 261 and a figure registration unit 271 are implemented when the control unit 200 executes a figure registration program 251. Furthermore, in the server 20, a registered figure database 252 is recorded in a storage unit 203.

In a case where a message containing a registration request is input from the communication unit 204, the figure similarity check unit 261 refers to data (figure data, a space ID, and the like) saved in the registered figure database 252 to check the similarity of the generated figure of the agent (the figure of the request target).

For example, in the figure similarity check unit 261, a parameter analysis unit 263 analyzes parameters of the figure (for example, each of parts such as the eyes, ears, and face shape) of the request target, and a face authentication unit 262 authenticates the figure (face) of the request target on the basis of the analysis result for the parameters.

Then, the figure similarity check unit 261 checks the similarity between the figure (face) of the request target and a figure (face) already registered in the public cyberspace on the basis of the authentication result for the figure (face).

Additionally, for example, in a case where a score value indicating the similarity is equal to or greater than a predetermined threshold value, that is, in a case where the figures are not similar (in a case where the figures are separated by a certain amount or more), the figure similarity check unit 261 determines that the figure of the request target is allowed to be registered and outputs this determination result to the figure registration unit 271.

The figure registration unit 271 saves data regarding the figure of the request target in the registered figure database 252 on the basis of the determination result from the figure similarity check unit 261.

Furthermore, the figure similarity check unit 261 outputs a message containing registration permission or rejection for the figure of the request target to the communication unit 204 to send the message to the information terminal 10 via the network 30. With this process, in the information terminal 10, registration permission or rejection for the figure of the request target is presented to the user by the paint tool 161.

Here, in a case where the figure of the request target is not allowed to be registered, the figure similarity check unit 261 sends a message to that effect to the information terminal 10 via the network 30. In addition, instead of the message that the figure of the request target is not allowed to be registered (or together with this message), a figure that is allowed to be registered may be proposed to the side of the information terminal 10 from the side of the server 20.

Figure 21:
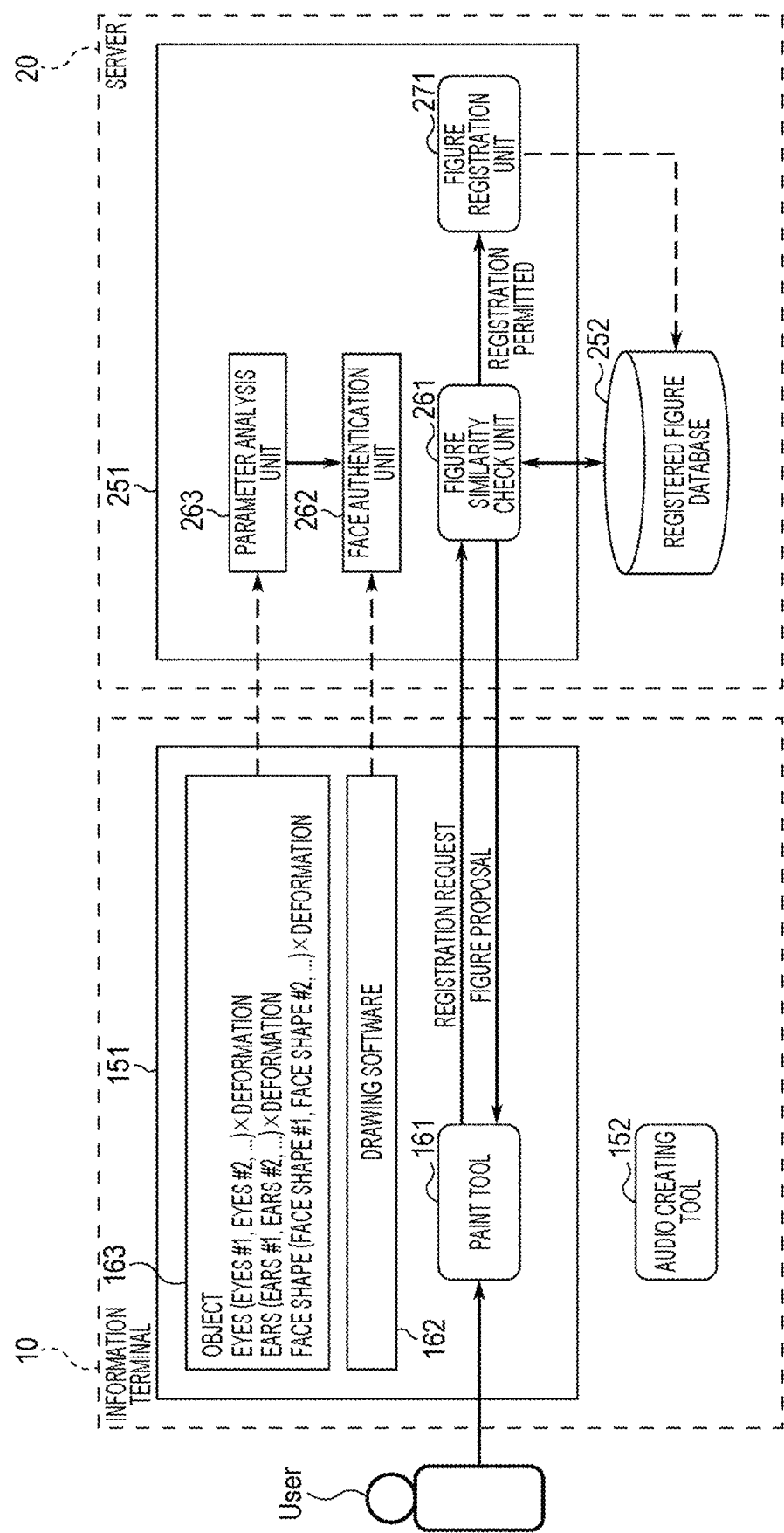
FIG. 21 is a diagram illustrating a second example of a specific configuration of the agent providing system.

That is, as illustrated in FIG. 21, in a case where the figure (face) of the request target is similar to the already registered figure (face) (in a case where the figures are not separated by a certain amount or more), the figure similarity check unit 261 proposes a figure that is allowed to be registered, for example, by performing the following process.

That is, the figure similarity check unit 261 adjusts parameters of the figure (for example, each of parts such as the eyes, ears, and face shape) of the request target to generate a figure (face) of the proposal target separated by a certain amount or more from the already registered figure (face). Then, the information terminal 10 is notified of data regarding the figure (face) of the proposal target generated in this manner, and the data is presented to the user.

Figure 22:
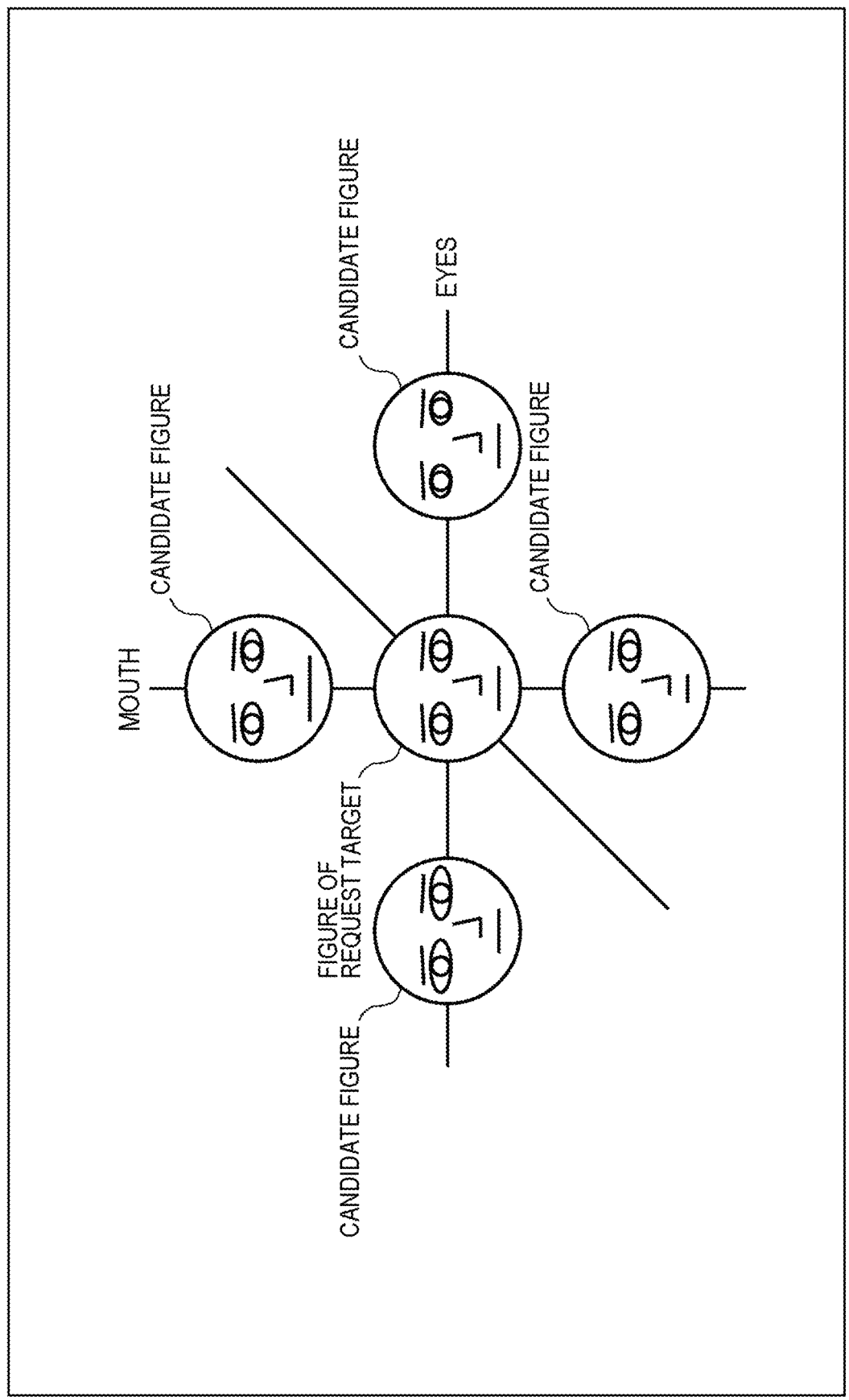
FIG. 22 is a diagram illustrating an example of proposing facial figures.

Specifically, in FIG. 22, in a case where the figure of the request target is arranged at the origin in a three-dimensional coordinate system where the axis in the horizontal direction (X direction) in the drawing is designated as an axis corresponding to parameters relating to "eyes", and the axis in the vertical direction (Y direction) in the drawing is designated as an axis corresponding to parameters relating to "mouth", figures (candidate figures) when these parameters are adjusted are illustrated.

In other words, in FIG. 22, two figures in which the parameters of the eyes of the figure (face) of the request target are adjusted are drawn on the axis in the horizontal direction as candidate figures (faces). Furthermore, in FIG. 22, two figures in which the parameters of the mouth of the figure (face) of the request target are adjusted are drawn on the axis in the vertical direction as candidate figures (faces). However, the four candidate figures (faces) illustrated here are supposed as figures (faces) separated by a certain amount or more from the already registered figures (faces).

The figure similarity check unit 261 can select one or a plurality of candidate figures (faces) from among the four candidate figures (faces) as figures of the proposal target and notify the information terminal 10 of the selected figures. In this manner, even in a case where there is a figure similar to the figure of the request target, a figure in which parameters of each part of the figure of the request target have been changed (a figure that is allowed to be registered) can be proposed.

Since the figure can be registered in a manner described above, the registered figure can be used to provide, as an agent (avatar) of the specified user, an agent (avatar) that is separated by a certain amount or more at least in terms of appearance from an agent (avatar) of another user already registered in the public cyberspace, for example.

Note that the agent (avatar) provided in this manner is assumed to be used by the specified user in applications such as chats or social media and can also be used as an agent as an own clone of the specified user used in applications such as chats.

(Overall Picture of Process)

Figure 23:
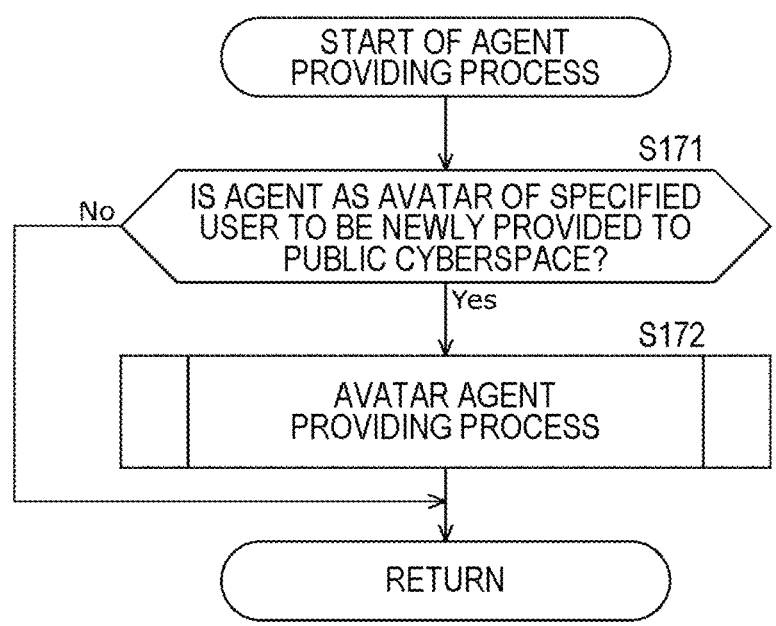
FIG. 23 is a flowchart explaining a flow of a fourth example of details of the agent providing process.
Figure 24:
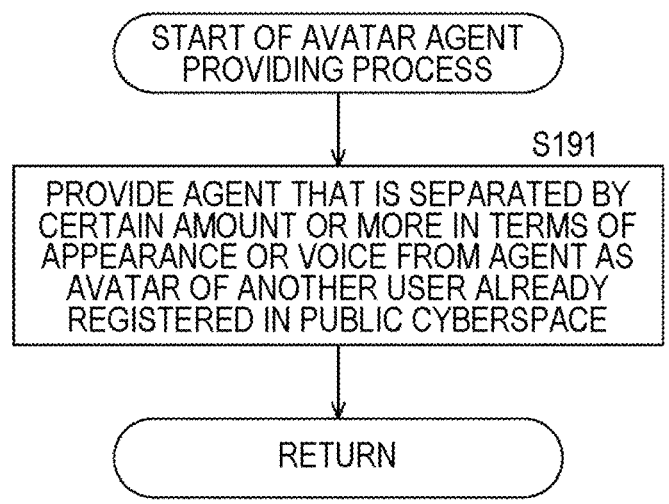
FIG. 24 is a flowchart explaining a flow of a first example of details of an avatar agent providing process.
Figure 25:
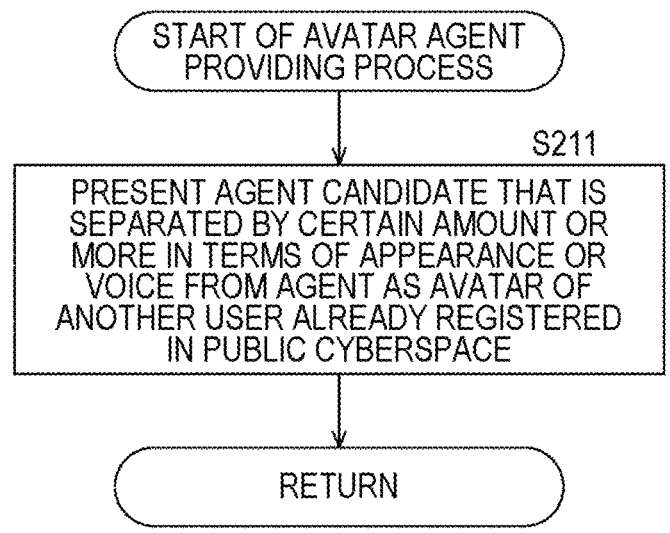
FIG. 25 is a flowchart explaining a flow of a second example of details of the avatar agent providing process.

Next, an overall picture of an agent providing process in the sixth embodiment will be described with reference to the flowcharts in FIGS. 23 to 25. Note that the agent providing process in FIG. 23 corresponds to the process in step S12 in FIG. 6.

In step S171, a control unit 200 determines whether or not to newly provide an agent as an avatar of the specified user to the public cyberspace.

In a case where it is determined to be affirmative in the determination process in step S171, the process proceeds to step S172. In step S172, the control unit 200 executes an avatar agent providing process.

Here, a first example of details of the avatar agent providing process corresponding to the process in step S172 in FIG. 23 will be described with reference to the flowchart in FIG. 24.

In step S191, the control unit 200 provides an agent that is separated by a certain amount or more in terms of appearance or voice from an agent as an avatar of another user already registered in the public cyberspace.

Specifically, for example, in a case where the figure of the agent is generated in the information terminal 10, the server 20 checks the similarity between the generated figure and the figure already registered in the public cyberspace and, in a case where these figures are not similar (in a case where these figures are separated by a certain amount or more), registers data regarding the generated figure (the example in FIG. 20).

By using the figure registered in a manner described above, an agent (avatar) that is separated by a certain amount or more at least in terms of appearance from an agent (avatar) of another user already registered in the public cyberspace can be provided.

Next, a second example of details of the avatar agent providing process corresponding to the process in step S172 in FIG. 23 will be described with reference to the flowchart in FIG. 25.

In step S211, the control unit 200 presents, to the user, an agent candidate that is separated by a certain amount or more in terms of appearance or voice from an agent as an avatar of another user already registered in the public space.

Specifically, in a case where the figure of the agent is generated in the information terminal 10, the server 20 checks the similarity between the generated figure and the figure already registered in the public cyberspace and, in a case where these figures are similar (in a case where these figures are not separated by a certain amount or more), proposes figures (figures that are allowed to be registered) according to one or a plurality of candidate figures (the examples in FIGS. 21 and 22).

By using the figure proposed in a manner described above, one or a plurality of agent (avatar) candidates that are separated by a certain amount or more at least in terms of appearance from an agent (avatar) of another user already registered in the public cyberspace can be presented.

As described above, when newly providing an agent (avatar) of a specified user to the public cyberspace, the agent providing system 1 can provide an agent that is separated by a certain amount or more in terms of appearance or voice from agents (avatars) of other users already registered in this public cyberspace.

7. Seventh Embodiment

In the above description, the appearance (figure) of the agent has been mainly described, but here, a method of generating the voice of the agent will be described.

For example, the user can generate the voice of the agent by operating an audio creating tool 152 (FIG. 20) executed in an information terminal 10. The information terminal 10 can register the voice of the agent by sending the generated voice to a server 20 via a network 30.

Figure 26:
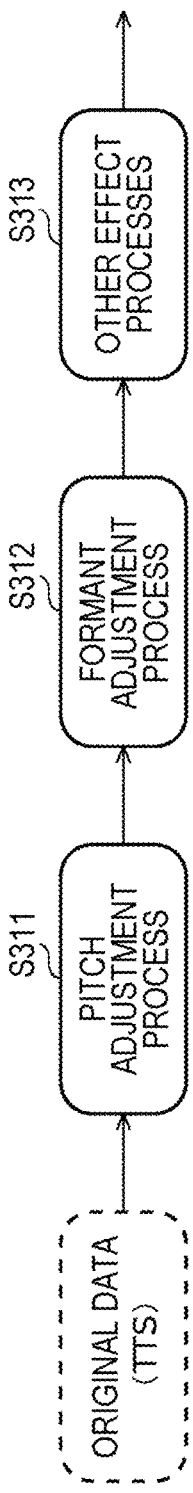
FIG. 26 is a diagram illustrating an example of a method of generating a voice of an agent.

FIG. 26 illustrates an example of a method of generating a voice of an agent.

When audio data obtained by converting a text into audio by text to speech (TTS) is input as the original data, a pitch adjustment process, a formant adjustment process, and other effect processes are sequentially carried out on the input audio data, and the voice of the agent is generated.

First, in the pitch adjustment process, a process of adjusting the pitch (musical interval) for the audio data is performed, and the audio is modified (S311).

Next, in the formant adjustment process, a process of adjusting a frequency component that features the voice of the agent is performed on the audio data, and the audio is modified (S312).

Formant denotes a plurality of temporally moving peaks obtained by observing a spectrum of an audio and is called a first formant frequency, a second formant frequency, a third formant frequency, and so forth in an order from the lowest frequency. Each formant frequency is important in vowel sound identification.

In this formant adjustment process, a more complex formant adjustment is made by, for example, performing the process for each formant frequency, such that audio variations can be formed. That is, here, the same adjustment is not applied to all vowel sounds, but a process different from the process that makes pitch adjustment and formant adjustment on the whole sounds is to be performed, such as emphasizing the feature of "sounds in the column of the vowel sound a".

Next, in the other effect processes, processes such as an effect are performed on the audio data, and the audio is modified (S313).

In these effect processes, for example, processes of putting overtone, inserting noise, or dropping bits are performed. Furthermore, here, a process for modifying the audio other than the effect processes may be performed.

In this manner, by sequentially carrying out the pitch adjustment process, the formant adjustment process, and other effect processes on the input audio data, for example, a voice that can be emotionally accepted by the user rather than a real voice uttered by a person can be developed as the voice of the agent.

8. Modifications

Other Configuration Examples

In the above description, the case where the agent providing system 1 is constituted by the information terminal 10 and the server 20 has been indicated. However, for example, another configuration such as a configuration with other equipment or an external server added may be used.

Specifically, the server 20 as one information processing device may be configured as a plurality of information processing devices by being divided into a server that performs a process for providing an agent, a database server in which data regarding the agent, and the like are saved, and the like. Similarly, the information terminal 10 may be constituted by not only one information processing device but also a plurality of information processing devices.

Furthermore, in the agent providing system 1, it is arbitrary which device includes the constituent elements (control units) constituting each device of the information terminal 10 and the server 20. For example, the information terminal 10 may execute a part of the processes for the information processing by the server 20 described above. Alternatively, using an edge computing technology, an edge server connected to a network (a peripheral portion of the network) close to the information terminal 10 may execute a part of the processes for the information processing by the server 20 described above.

In the present disclosure, a system refers to a collection of a plurality of constituent elements (e.g., devices and modules (constituent members)), and whether or not all the constituent elements are arranged within the same casing is not regarded as important. Accordingly, a plurality of devices accommodated in separate casings so as to be connected to one another via a network and one device of which a plurality of modules is accommodated within one casing are both deemed as systems.

Furthermore, it is also arbitrary what communication form each constituent element has. In different terms, each constituent element may be connected via a local network (a local area network (LAN) or a wide area network (WAN)) as the network 30, in addition to a communication network such as the Internet or a mobile phone network. Additionally, each of the constituent elements may be connected by wire or wirelessly.

9. Configuration of Computer

A series of the above-described processes (for example, the agent providing process in FIG. 6, and the like) can be executed by hardware or software. In a case where the series of processes is executed by software, a program constituting the software is installed in a computer of each device.

Figure 27:
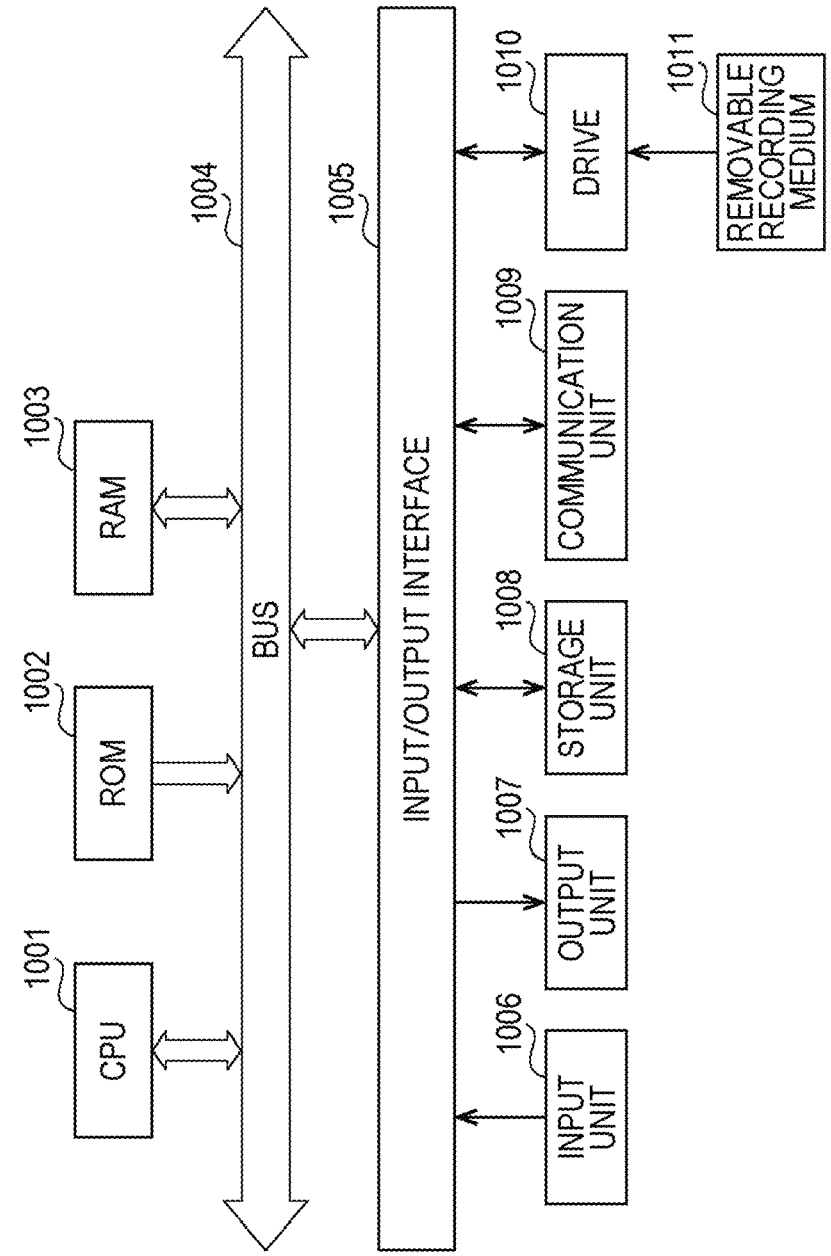
FIG. 27 is a diagram illustrating an example of a configuration of a computer.

FIG. 27 is a block diagram illustrating an example of a hardware configuration of a computer that executes the above-described series of processes using a program.

In the computer, a central processing unit (CPU) 1001, a read only memory (ROM) 1002, and a random access memory (RAM) 1003 are interconnected through a bus 1004. Additionally, an input/output interface 1005 is connected to the bus 1004. An input unit 1006, an output unit 1007, a storage unit 1008, a communication unit 1009, and a drive 1010 are connected to the input/output interface 1005.

The input unit 1006 includes a microphone, a keyboard, a mouse, and the like. The output unit 1007 includes a speaker, a display, and the like. The storage unit 1008 includes a hard disk, a nonvolatile memory, and the like. The communication unit 1009 includes a network interface and the like. The drive 1010 drives a removable recording medium 1011 such as a magnetic disk, an optical disc, a magneto-optical disk, or a semiconductor memory.

In the computer configured as described above, the above-described series of processes is performed in such a manner that the CPU 1001 loads a program recorded in the ROM 1002 or the storage unit 1008 into the RAM 1003 via the input/output interface 1005 and the bus 1004 to execute.

For example, the program executed by the computer (CPU 1001) can be provided by being recorded in the removable recording medium 1011 serving as a package medium or the like. Furthermore, the program can be provided via a wired or wireless transmission medium such as a local area network, the Internet, or digital satellite broadcasting.

In the computer, the program can be installed to the storage unit 1008 via the input/output interface 1005 by mounting the removable recording medium 1011 in the drive 1010. Furthermore, the program can also be installed to the storage unit 1008 via a wired or wireless transmission medium when received by the communication unit 1009. As an alternative manner, the program can be installed to the ROM 1002 or the storage unit 1008 in advance.

Here, in the present description, the processes performed by the computer in accordance with the program do not necessarily have to be performed chronologically in the order described as the flowcharts. That is, the processes performed by the computer in accordance with the program include processes executed in parallel or individually (for example, parallel processes or processes by an object). In addition, the program may be processed by a single computer (processor) or distributedly processed by a plurality of computers.

Note that the embodiments according to the present technology are not limited to the above-described embodiments and a variety of changes can be made without departing from the scope of the present technology.

Furthermore, the present technology can also be configured as described below.

(1)

An agent providing system including
a control unit that, when newly providing an agent to a cyberspace in which a plurality of agents is allowed to be registered, provides an agent that is separated by a certain amount or more in terms of appearance or voice from an agent already registered in the cyberspace.

(2)

The agent providing system according to (1) above, in which
the control unit:
determines that a new agent is separated by a certain amount or more in terms of appearance or voice from the agent already registered in the cyberspace; and
provides an agent so determined.

(3)

The agent providing system according to (1) or (2) above, in which
the control unit:
newly generates an agent separated by a certain amount or more in terms of appearance or voice from the agent already registered in the cyberspace; and
provides the generated agent.

(4)

The agent providing system according to (1) above, in which
the control unit, when newly providing an agent for a specified user to a private cyberspace accessible by the specified user, provides an agent that is separated by a certain amount or more from an appearance or a voice of an agent that is already registered in the private cyberspace and used by the specified user.

(5)

The agent providing system according to (4) above, in which
an agent for a specified purpose has a first appearance or a first voice, and
the control unit:
when providing the agent for the specified purpose for a first user, provides the agent for the specified purpose having a second appearance or a second voice different from the first appearance or the first voice when the first appearance or the first voice is not separated by a certain amount or more from either an appearance or a voice of an agent already held by the first user; and
when providing the agent for the specified purpose for a second user, provides the agent for the specified purpose with the first appearance or the first voice kept when appearances or voices of all agents already held by the second user are separated by a certain amount or more from the first appearance or the first voice.

(6)

The agent providing system according to (4) above, in which
when providing an agent used by a group made up of a first user and a second user, the control unit provides an agent having an appearance or a voice different from appearances or voices of all agents already held by the first user and the second user.

(7)

The agent providing system according to any one of (4) to (6) above, in which
the control unit:
confirms whether or not identification with respect to an agent already used by a user based on an appearance or a voice of an agent newly provided to the user is possible for the user; and
provides a new agent having an identifiable appearance or voice to the user according to a result of the confirmation.

(8)

The agent providing system according to (7) above, in which
when the user answers that identification with respect to the agent already used by the user based on the appearance or the voice of the agent newly provided to the user is not possible, the control unit generates an agent having a new appearance or voice different from the appearance or the voice by which identification is not possible.

(9)

The agent providing system according to (8) above, in which
the control unit:
learns a characteristic when the user identifies the appearance or the voice of the agent according to the answer from the user; and
generates an agent having a new appearance or a voice according to the characteristic.

(10)

The agent providing system according to (1) above, in which
the control unit,
when newly providing an agent as an avatar of a specified user to a public cyberspace accessible by a plurality of users,
provides an agent that is separated by a certain amount or more in terms of appearance or voice from an agent as an avatar of another user already registered in the public cyberspace.

(11)

The agent providing system according to (10) above, in which
the control unit,
when newly providing the agent as the avatar of the specified user to the public cyberspace accessible by the plurality of users,
presents, to the user, an agent candidate that is separated by a certain amount or more in terms of appearance or voice from an agent as an avatar of another user already registered in the public cyberspace.

(12)

An agent providing method including,
when newly providing an agent to a cyberspace in which a plurality of agents is allowed to be registered,
providing, by an agent providing system, an agent that is separated by a certain amount or more in terms of appearance or voice from an agent already registered in the cyberspace.

(13)

A recording medium recording a program for causing a computer to function as a control unit that,
when newly providing an agent to a cyberspace in which a plurality of agents is allowed to be registered, provides an agent that is separated by a certain amount or more in terms of appearance or voice from an agent already registered in the cyberspace.

REFERENCE SIGNS LIST

1 Agent providing system
10, 10-1 to 10-N Information terminal
20 Server
30 Network
100 Control unit
101 Input unit
102 Output unit
103 Storage unit
104 Communication unit
111 Agent processing unit
112 Presentation control unit
113 Communication control unit
121 Mouse
122 Keyboard
131 Display
132 Speaker
151 Figure creating tool
152 Audio creating tool
161 Paint tool
162 Drawing software
163 Object
200 Control unit
201 Input unit
202 Output unit
203 Storage unit
204 Communication unit
211 Agent providing unit
212 Learning unit
213 Communication control unit
251 Figure registration program
252 Registered figure database
261 Figure similarity check unit
262 Face authentication unit
263 Parameter analysis unit
271 Figure registration unit
1001 CPU
1011 Removable recording medium

The invention claimed is:

1. An agent providing system comprising processing circuitry configured to:
provide, when newly providing an agent to a cyberspace in which a plurality of agents is allowed to be registered, an agent that is separated by a certain amount or more in terms of appearance or voice from an agent already registered in the cyberspace; and
provide, when newly providing an agent for a specified user to a private cyberspace accessible by the specified user, an agent that is separated by a certain amount or more from an appearance or a voice of an agent that is already registered in the private cyberspace and used by the specified user,
wherein the agent for a specified purpose has a first appearance or a first voice, and
wherein the processing circuitry is further configured to:
provide, when providing the agent for the specified purpose for a first user, the agent for the specified purpose having a second appearance or a second voice different from the first appearance or the first voice when the first appearance or the first voice is not separated by a certain amount or more from either an appearance or a voice of the agent already held by the first user; and provide when providing the agent for the specified purpose for a second user, the agent for the specified purpose with the first appearance or the first voice kept when appearances or voices of all agents already held by the second user are separated by a certain amount or more from the first appearance or the first voice.

2. The agent providing system according to claim 1, wherein the processing circuitry is further configured to:
determine that a new agent is separated by a certain amount or more in terms of appearance or voice from the agent already registered in the cyberspace; and
provide the agent so determined according to the determination.

3. The agent providing system according to claim 1, wherein the processing circuitry is further configured to:
newly generate an agent separated by a certain amount or more in terms of appearance or voice from the agent already registered in the cyberspace; and
provide the generated agent.

4. The agent providing system according to claim 1, wherein processing circuitry is further configured to provide, when providing an agent used by a group made up of a first user and a second user, an agent having an appearance or a voice different from appearances or voices of all agents already held by the first user and the second user.

5. The agent providing system according to claim 1, wherein the processing circuitry is further configured to:
confirm whether or not identification with respect to an agent already used by a user based on an appearance or a voice of an agent newly provided to the user is possible for the user; and
provide a new agent having an identifiable appearance or voice to the user according to a result of the confirmation.

6. The agent providing system according to claim 5, wherein processing circuitry is further configured to generate, when the user answers that identification with respect to the agent already used by the user based on the appearance or the voice of the agent newly provided to the user is not possible, an agent having a new appearance or voice different from the appearance or the voice by which identification is not possible.

7. The agent providing system according to claim 6, wherein the processing circuitry is further configured to:
learn a characteristic when the user identifies the appearance or the voice of the agent according to the answer from the user; and
generate an agent having a new appearance or a voice according to the characteristic.

8. The agent providing system according to claim 1, wherein the processing circuitry is further configured to provide, when newly providing an agent as an avatar of a specified user to a public cyberspace accessible by a plurality of users, an agent that is separated by a certain amount or more in terms of appearance or voice from an agent as an avatar of another user already registered in the public cyberspace.

9. The agent providing system according to claim 8, wherein the processing circuitry is further configured to present to the user, when newly providing the agent as the avatar of the specified user to the public cyberspace accessible by the plurality of users, an agent candidate that is separated by a certain amount or more in terms of appearance or voice from an agent as an avatar of another user already registered in the public cyberspace.

10. An agent providing method comprising:
providing by an agent providing system, when newly providing an agent to a cyberspace in which a plurality of agents is allowed to be registered, an agent that is separated by a certain amount or more in terms of appearance or voice from an agent already registered in the cyberspace;
providing, when newly providing an agent for a specified user to a private cyberspace accessible by the specified user, an agent that is separated by a certain amount or more from an appearance or a voice of an agent that is already registered in the private cyberspace and used by the specified user;
providing, when providing for a first user an agent for a specified purpose having a first appearance or a first voice, the agent for the specified purpose having a second appearance or a second voice different from the first appearance or the first voice when the first appearance or the first voice is not separated by a certain amount or more from either an appearance or a voice of the agent already held by the first user; and
providing, when providing the agent for the specified purpose for a second user, the agent for the specified purpose with the first appearance or the first voice kept when appearances or voices of all agents already held by the second user are separated by a certain amount or more from the first appearance or the first voice.

11. The agent providing method according to claim 10, further comprising providing, when providing an agent used by a group made up of a first user and a second user, an agent having an appearance or a voice different from appearances or voices of all agents already held by the first user and the second user.

12. The agent providing method according to claim 10, further comprising:
confirming whether or not identification with respect to an agent already used by a user based on an appearance or a voice of an agent newly provided to the user is possible for the user; and
providing a new agent having an identifiable appearance or voice to the user according to a result of the confirmation.

13. The agent providing method according to claim 12, further comprising generating, when the user answers that identification with respect to the agent already used by the user based on the appearance or the voice of the agent newly provided to the user is not possible, an agent having a new appearance or voice different from the appearance or the voice by which identification is not possible.

14. The agent providing method according to claim 13, further comprising:
learning a characteristic when the user identifies the appearance or the voice of the agent according to the answer from the user; and
generating an agent having a new appearance or a voice according to the characteristic.

15. The agent providing system method to claim 10, further comprising providing, when newly providing an agent as an avatar of a specified user to a public cyberspace accessible by a plurality of users, an agent that is separated by a certain amount or more in terms of appearance or voice from an agent as an avatar of another user already registered in the public cyberspace.

16. A non-transitory, computer-readable recording medium storing instructions that, when executed by a processor in an agent providing system, control the electronic device to implement a method comprising:
- providing by an agent providing system, when newly providing an agent to a cyberspace in which a plurality of agents is allowed to be registered, an agent that is separated by a certain amount or more in terms of appearance or voice from an agent already registered in the cyberspace;
- providing, when newly providing an agent for a specified user to a private cyberspace accessible by the specified user, the agent that is separated by a certain amount or more from an appearance or a voice of the agent that is already registered in the private cyberspace and used by the specified user,
- providing, when providing for a first user an agent for a specified purpose having a first appearance or a first voice, the agent for the specified purpose having a second appearance or a second voice different from the first appearance or the first voice when the first appearance or the first voice is not separated by a certain amount or more from either an appearance or a voice of the agent already held by the first user; and
- providing, when providing the agent for the specified purpose for a second user, the agent for the specified purpose with the first appearance or the first voice kept when appearances or voices of all agents already held by the second user are separated by a certain amount or more from the first appearance or the first voice.

17. The non-transitory, computer-readable recording medium according to claim 16, further comprising instructions that control the electronic device to implement the method comprising providing, when providing an agent used by a group made up of a first user and a second user, an agent having an appearance or a voice different from appearances or voices of all agents already held by the first user and the second user.

18. The non-transitory, computer-readable recording medium according to claim 16, further comprising instructions that control the electronic device to implement the method comprising:
- confirming whether or not identification with respect to the agent already used by a user based on an appearance or a voice of an agent newly provided to the user is possible for the user; and
- providing a new agent having an identifiable appearance or voice to the user according to a result of the confirmation.

19. The non-transitory, computer-readable recording medium according to claim 18, further comprising instructions that control the electronic device to implement the method comprising generating, when the user answers that identification with respect to the agent already used by the user based on the appearance or the voice of the agent newly provided to the user is not possible, an agent having a new appearance or voice different from the appearance or the voice by which identification is not possible.

20. The non-transitory, computer-readable recording medium according to claim 19, further comprising instructions that control the electronic device to implement the method comprising:
- learning a characteristic when the user identifies the appearance or the voice of the agent according to the answer from the user; and
- generating an agent having a new appearance or a voice according to the characteristic.

* * * * *